(12) United States Patent
Chen et al.

(10) Patent No.: US 9,454,807 B2
(45) Date of Patent: Sep. 27, 2016

(54) METHODS AND SYSTEMS FOR DENOISING IMAGES

(71) Applicant: Spreadtrum Communications (Shanghai) Co., Ltd., Shanghai (CN)

(72) Inventors: Minjie Chen, Shanghai (CN); Le Zhang, Shanghai (CN); Haijun Niu, Shanghai (CN); Fuhuei Lin, Shanghai (CN)

(73) Assignee: SPREADTRUM COMMUNICATIONS (SHANGHAI) CO., LTD., Cambridge (GB)

( * ) Notice: Subject to any disclaimer, the term of this patent is extended or adjusted under 35 U.S.C. 154(b) by 0 days.

(21) Appl. No.: 14/759,061

(22) PCT Filed: Mar. 25, 2014

(86) PCT No.: PCT/CN2014/074033
§ 371 (c)(1),
(2) Date: Jul. 2, 2015

(87) PCT Pub. No.: WO2015/143624
PCT Pub. Date: Oct. 1, 2015

(65) Prior Publication Data
US 2016/0253787 A1 Sep. 1, 2016

(51) Int. Cl.
*G06K 9/00* (2006.01)
*G06T 5/00* (2006.01)
*G06T 5/50* (2006.01)
*G06T 5/10* (2006.01)

(52) U.S. Cl.
CPC ............... *G06T 5/002* (2013.01); *G06T 5/10* (2013.01); *G06T 5/50* (2013.01); *G06T 2207/10024* (2013.01); *G06T 2207/20052* (2013.01); *G06T 2207/20064* (2013.01)

(58) Field of Classification Search
CPC .......... G06T 5/002; G06T 5/50; G06T 5/10; G06T 2007/10024; G06T 2207/20052; G06T 2207/20064
USPC ........................................................ 382/275
See application file for complete search history.

(56) References Cited

U.S. PATENT DOCUMENTS

| | | | |
|---|---|---|---|
| 2009/0317016 A1 | 12/2009 | Cho et al. | |
| 2014/0119628 A1* | 5/2014 | Elad | G06T 11/006 382/131 |
| 2015/0086126 A1* | 3/2015 | Senzaki | G06T 5/002 382/263 |
| 2015/0187053 A1* | 7/2015 | Chen | G06T 5/002 382/264 |
| 2015/0312495 A1* | 10/2015 | Pan | G06T 3/00 348/241 |

FOREIGN PATENT DOCUMENTS

| | | |
|---|---|---|
| CN | 101861728 | 10/2010 |
| CN | 102289793 | 12/2011 |

(Continued)

OTHER PUBLICATIONS

PCT International Search Report dated Dec. 9, 2014, PCT Patent Application PCT/CN2014/074033.

(Continued)

*Primary Examiner* — Tom Y Lu
(74) *Attorney, Agent, or Firm* — Vierra Magen Marcus LLP

(57) ABSTRACT

Shrinkage function model associated training schemes are used to facilitate obtaining denoised patches, and more particularly, to removing noise from images.

27 Claims, 20 Drawing Sheets

(56) References Cited

FOREIGN PATENT DOCUMENTS

| | | |
|---|---|---|
| CN | 103533261 | 1/2014 |
| JP | H0865550 | 3/1996 |

OTHER PUBLICATIONS

PCT Written Opinion of the International Searching Authority dated Jan. 4, 2015, PCT Patent Application PCT/CN2013/091125.
English Abstract of Chinese Patent Application No. CN101861728.
English Abstract of Chinese Patent Application No. CN103533261.
English Abstract of Chinese Patent Application No. CN102289793.
English Abstract of Japanese Patent Application No. JP-H0865550.

* cited by examiner

METHODS AND SYSTEMS FOR DENOISING IMAGES

BACKGROUND

In the past few decades, digital imaging proliferated. Most images are captured digitally, and analog images are converted to digital images for processing, storage, and display. Consumers and professionals alike have high demands and expectations for image quality. An important aspect of image quality is noise level. There are various types of noises, such as chroma noise and lumna noise from image sensor and compression noise attributed to image processing. It is a challenge to remove noises from images with minimal degradation to image sharpness. While many conventional imaging techniques are available, they are inadequate for various reasons. It is desirable to have novel noise reduction methods and systems thereof.

SUMMARY

Described herein are various embodiments of methods and systems for denoising algorithm for Bayer color filter array (CFA) images and, but not by way of limitation, to a denoising algorithm amongst other image patterns. In some embodiments, instead of using the identical hard thresholding filtering strategy, a number of shrinkage functions for different coefficients are learned in a training model. This may further be extended for learning the shrinkage function model in the mean red green blue (RGB) estimation and green-red green-blue (GrGb) correction. In some embodiments, a matching type estimation (MTE) step is explored where the patches with different matching types will have their own unique shrinkage function model. The MTE and collaborative filtering (COLF) may be integrated in the training model.

In various embodiments, the present disclosure includes methods for removing noise from an image. The present invention may further include, without limitation, selecting one or more patches of a first image having a noise profile as a set of noisy patches, each noisy patch having a set of n by n pixels, selecting one or more patches of a second image without the noise profile as a set of clean patches, each clean patch having a set of n by n pixels, estimating one or more patch types for the set of noisy patches, constructing a shrinkage function model based on the one or more patch types and the set of n by n pixels of the noisy patch and the clean patch respectively, applying the shrinkage function model to a third image to obtain a set of n by n denoised patches, and reconstructing the set of n by n denoised patches to remove noise from the third image.

The present invention for removing noise from an image may further include, without limitation, selecting one or more patches with the same color configuration, selecting one or more patches with different color configurations respectively, estimating spatial distribution of the one or more patches of the first image, calculating patch distances between one or more adjacent patches of the first image, classifying patch types and grouping similar patch types based on the calculated patch distances, and rotating the first patch and the second patch in order to have a same color configuration of the first patch and the second patch. The shrinkage function model may further comprise n by n shrinkage coefficients for each patch type respectively, a fast block matching algorithm for classifying patch type, and an n-dimensional vector represents number of matched patches in each direction of the fast block matching algorithm for estimating patch types.

In another embodiment, the present disclosure provides methods for removing noise from an image, the method may further comprise selecting a patch of an image, the patch having a first set of n by n pixels, each pixel having a red green blue (RGB) value, determining a mean RGB value for the patch, estimating a patch type for the patch, subtracting each of the RGB values of the n by n pixels of the patch from the mean RGB value to obtain a second set of n by n pixels, performing a 2D transformation on the second set of n by n pixels to obtain n by n frequency domain coefficients, performing a 3D transformation on the n by n frequency domain coefficients for s similar patches to obtain n by n by s 3D coefficients, obtaining a set of shrinkage functions associated with a noise profile of an image sensor and the patch types of the patch, performing a shrinkage process using the set of shrinkage functions for the n by n by s set of 3D coefficients to obtain an n by n by s set of denoised frequency domain values, and performing one or more inverse transformations on the n by n by s denoised frequency domain values to obtain an n by n set of denoised pixel values.

The present invention for removing noise from an image may further include, without limitation, constructing a shrinkage function model, selecting one or more patches with the same color configuration, selecting one or more patches with different color configurations respectively, estimating spatial distribution of the one or more patches, calculating patch distances between one or more adjacent patches, classifying patch types and grouping similar patch types based on the calculated patch distances, and rotating one or more patches in order to have a same color configuration. The shrinkage function model may further comprise a unique shrinkage curve for each of the n by n by s set of 3D coefficients, n by n shrinkage coefficients for each patch type respectively, a 2D discrete cosine transform (2D-DCT), a 2D discrete wavelet transform (2D-DWT) transform following with a 1-D Haar/Hadamard transform, a fast block matching algorithm, an n-dimensional vector represents number of matched patches in each direction of the fast block matching algorithm, and a green-red green-blue (GrGb) correction process as well as an alternative chromatic value correction.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

The subject matter that is regarded as the invention is particularly pointed out and distinctly claimed in the claims at the conclusion of the specification. Also, the drawings are not necessarily to scale, with an emphasis instead generally being placed upon illustrating the principles of the invention. The foregoing and other objects, features, and advantages will be apparent from the following detailed description taken in conjunction with the accompanying drawings.

DETAILED DESCRIPTION

Figure 1A:
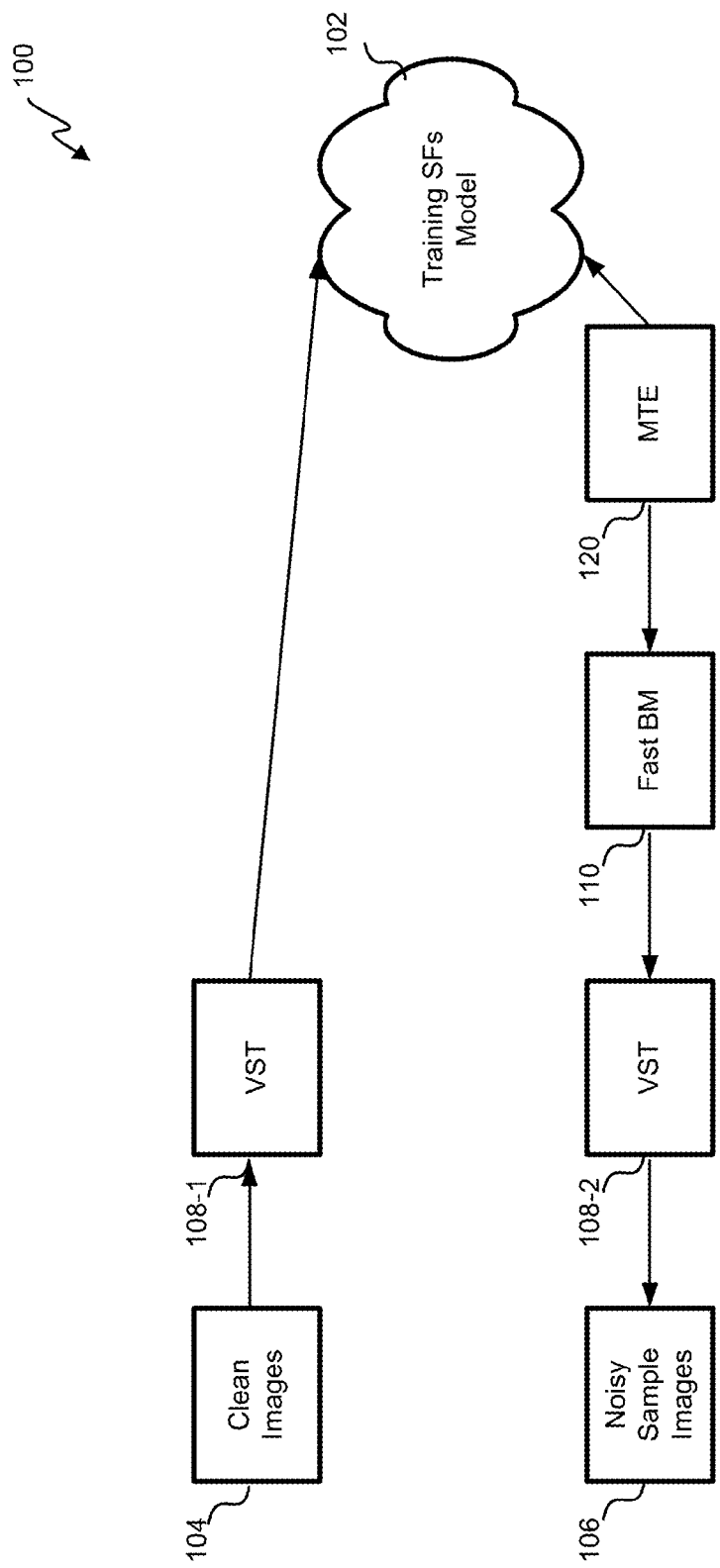
FIG. 1A depicts a flowchart of forming a training shrinkage function (SF) model, according to some embodiments.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and algorithms are shown in block diagram form.

Many denoising algorithms have been proposed in recent years. Among them, patch-based non-local solutions, such as Block-matching 3D (BM3D) filtering, have become the state-of-the-art. The core of BM3D is to search and group similar patches and a denoising model is then executed on the similar patches collaboratively in a 3 dimensional (3-D) transform domain. After a shrinkage process, such as a hard thresholding filter or a Wiener filter in a 3-D transform domain, the denoised patches, which are obtained via an inverse 3-D transform, are weighted to reconstruct the denoised image. However, the high computational cost of the block-matching method has made it impractical for real-time applications. Moreover, BM3D is a two-step denoising process. First, in the shrinkage process, identical parameters are used for the initial hard thresholding process. In the second step, a Wiener filtering is performed by considering the initial estimation of a true energy spectrum. These procedures make hardware design difficult.

Usually, if a demosaicing process is applied directly on a noisy image, spatially correlated noise will be incurred, whereas the assumed noise models of the most denoising algorithms are independent and identically distributed (I.I.D.) noise models. Therefore, it is crucial to operate a denoising model on a Bayer domain before a demosaicing process. Consequently, there is a need for a system and method that can provide easy and fast construction and application of a denoising algorithm to reduce noise of raw images with Bayer patterns.

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

The present disclosure is generally directed towards signal noise reduction. Although described in the context of image signals throughout, the various aspects of the present disclosure may be applicable to any scenario in which it is desirable to implement computationally inexpensive image processing, signal processing and/or the like techniques to filter undesired signal noise, as opposed to attempting to address the issue of image noise by optimizing physical aspects of a particular system such as, for example, physical connection/connector optimization, circuit architecture optimization, and others. Optimizing physical aspects of a particular system may be at least somewhat effective on an application-by-application, or case-by-case, basis. However, it may be difficult to address image noise reduction across a broad spectrum by investing resources to optimize physical system aspects alone. Image processing on the other hand is extensible, or portable, in the sense that a core noise reduction and/or denoising algorithm, such as described below, may generally be incorporated within any system to implement image noise reduction, aside from modifications that may be necessary due to implementation-specific requirements in software or firmware.

As used herein, the term "RGB" or "RGB value" or "RGB pattern" may refer to an image with three primary colors, red, green and blue. As used herein, the term "Bayer image" or "Bayer pattern" or "Bayer format" may refer to color configurations with different RGB values of one or more pixels of an image. As used herein, the term "raw image" may refer to a Bayer pattern image, which has a raw output of a Bayer-filer cameras or sensors. Since each pixel is filtered to record only one of the three primary colors, the data from each pixel cannot fully determine color on its own. To obtain a full-color image, one or more demosaicing algorithms may be used to interpolate a set of complete red, green, and blue values for one or more pixels of the full color image. As used herein, the term "shrinkage function (SF)" or "training SF" or "training SF model" may refer to a process of forming one or more training shrinkage functions or one or more training shrinkage functions models to denoise one or more noisy images. As used herein, the term "coefficients (Coeff.) shrinkage" may refer to shrinkage function apply to the coefficients in the transform and/or frequency domain.

Referring first to FIG. 1, an exemplary flowchart for a training model 100 is shown. FIG. 1A depicts a flowchart of forming a training SF model 102 that may start with one or more clean images 104 and one or more noisy sample images 106 as input data. In some embodiments, a way to denoise an unknown or random image is to build a denoising training model and apply it to the image. The training SF model 102 may be built by analyzing a set of "training data" (i.e. a predetermined set of many data points of both noisy and clean images data) that maps known "input variables" (e.g. training SF model 102) to know "output values" (e.g. denoised image of a random noisy image). Once built, a data stream of clean images and noisy images are applied to the model; given the data stream's random input, for example, the model predicts the denoised result of the random image. In some embodiments, although shown both clean and noisy images in the training SF model 102, the training SF model 102 can be built with the noisy images alone. To accurately predict the denoised image, the set of training data may comprise one or more noisy image samples to make sure the training data is large enough to encompass many representative image data of each patch. In general, the training model 100 may be wholly or at least partially implemented by a special-purpose computing system or device, which itself may, in some embodiments, be configured based on implementation-specific requirements or specifications. An example of such a computing system or device is described in further detail below in connection with FIG. 8.

In some embodiments, the clean images 104 and noisy sample images 106 may be a subset of the noisy or clean data and build the training SF model 102 based on the sampling. In some embodiments, the one or more noisy sample images 106 data is measured by an image sensor system. As the terms are used herein, a particular type of image to be filtered and/or enhanced is the "clean" image. The clean images 104 may be a result of utilizing an enhanced image from any denoising algorithm to reduce noise of the noisy sample images 106. The process of building the training SF model 102 further comprising apply variance stabilization transform (VST) 108, fast Block Matching (BM) 110, and match type estimation (MTE) 120 to the input data for both clean images 104 and noisy sample images 106. The VST 108 may be performed by using forward/backward generalized anscombe transform (GAT), when the noise data is not identically distributed (I.I.D.) Gaussian data (e.g. signal-dependent noise data). In some embodiments, if the International Standards Organization (ISO) value is known for a given image sensor, by assuming a Poisson-Gaussian noise model, the VST 108 is used to convert the color filter array (CFA) image to approximated I.I.D. Gaussian data. For unknown ISO values or different gain settings, different parameters will be used, which may be trained on a specified sensor beforehand. In some embodiments, the noise models may vary for different sensors with a known ISO value. For each sensor, different measurement may be needed for different ISO values.

In some embodiments, the MTE 120 is performed where the patch distance is approximated by the distance of the two neighbor patches along the Geodesic distance path. As used herein, the term "Geodesic distance" or "Geodesic value" may refer to the shortest path and/or distance between any 2 pixel points of an image. Fast BM 110 may be performed on 4×4, 6×6 or 8×8 image patches with a similar computational cost. Traditional algorithms have a constraint for processing only the patches with the same color configurations (e.g. green, red, and blue pattern configurations). In some embodiments, a rotation process is added, therefore the search of the similar patches may be extended for the patches with different color configurations. As used herein, the term "patch" may refer to a section of an image with n×n color blocks. In some embodiments, the different type of the patch may refer to different patch types (e.g. flat, structural and texture regions, but not by way of limitation to three matching types) based on different spatial distribution of the patches. For example, a high level of noise reduction is to be performed on a flat region, and a low level of noise reduction is to be performed on a textured region.

Figure 1B:
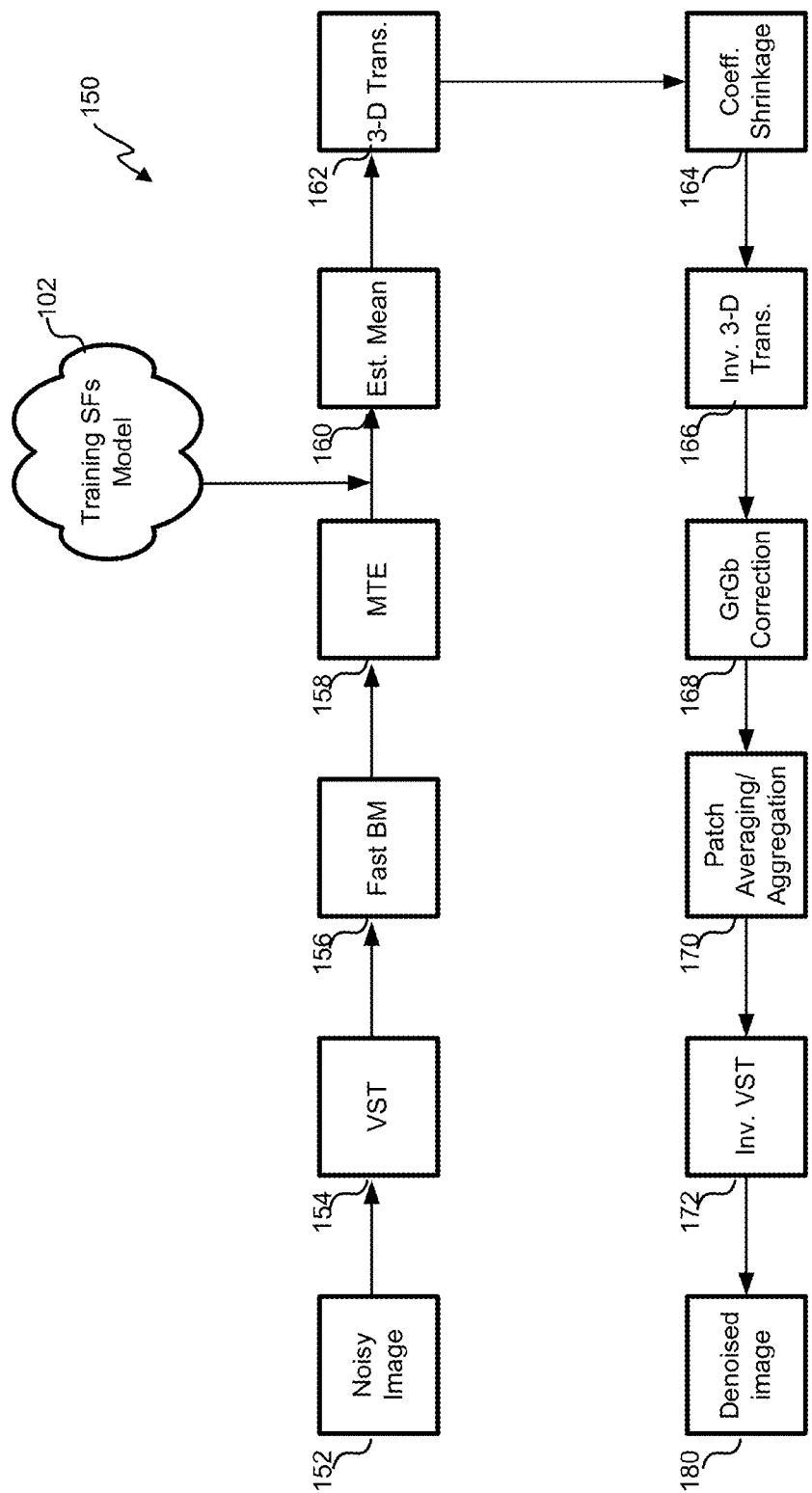
FIG. 1B depicts a flowchart of applying the training SF model to denoise a noisy image, according to some embodiments.

FIG. 1B depicts a denoising model with a flowchart 150 of applying the training SF model 102 on a random noisy image 152, according to some embodiments. In some embodiments, an 8-direction (8-D) Fast BM 156 is demonstrated with an 8-D vector that represents the number of matched patches in each direction. Although this embodiment only shows the 8-D Fast BM 156 (further detail below in connection with FIG. 3), it is to be understood that different number of directions may be used in various embodiments. In some embodiments, the training of the training SF model 102 is applied to the random noisy image 152, following by VST 154, fast BM 156 and MTE 158. After the MTE 158, the training process of the training SF model 102 may be introduced to the flowchart. In the next step, a mean RGB value estimation 160 is performed based on the similar patches. The denoising procedure is then executed on these similar patches collaboratively in a 3-D transform domain 162. As used herein, the term "collaborative" may involve processing multiple patches together in the denoising process. The 3D transform domain may comprise a 2 dimensional discrete cosine transform (2D-DCT) or a 2-D discrete wavelet transform (2D-DWT) following with a 1-D Haar/Hadamard transform, and/or the like. In some embodiments, the MTE 158 may comprise a set of pre-defined or trained decision rules on different spatial matching distribution of different patch types (e.g. flat, structural and texture regions, but not by way of limitation to three matching types). In one embodiment, the spatial distribution of the similar patches may refer to steering kernel estimation, which is detailed in Takeda, Farsiu, & Milanfar, "Kernel regression of image processing and reconstruction", *IEEE Tran. on image processing*, 16(2), 349-366, 2007 (the entire disclosure of which is hereby incorporated by reference). The flowchart 150 may also comprise coefficient shrinkage 164, inverse 3-D transform 166, green-red green-blue (GrGb) correction 168, which is explained in greater detail in relation to FIG. 2 below. Patch averaging or patch aggregation 170 and inverse VST 172 may applied to the data in order to get a denoised image 180. In general, the applying flowchart 150 of the training SF model 102 may be wholly or at least partially implemented by a special-purpose computing system or device, which itself may, in some embodiments, be configured based on implementation-specific requirements or specifications. An example of such a computing system or device is described in further detail below in connection with FIG. 8.

Figure 2:
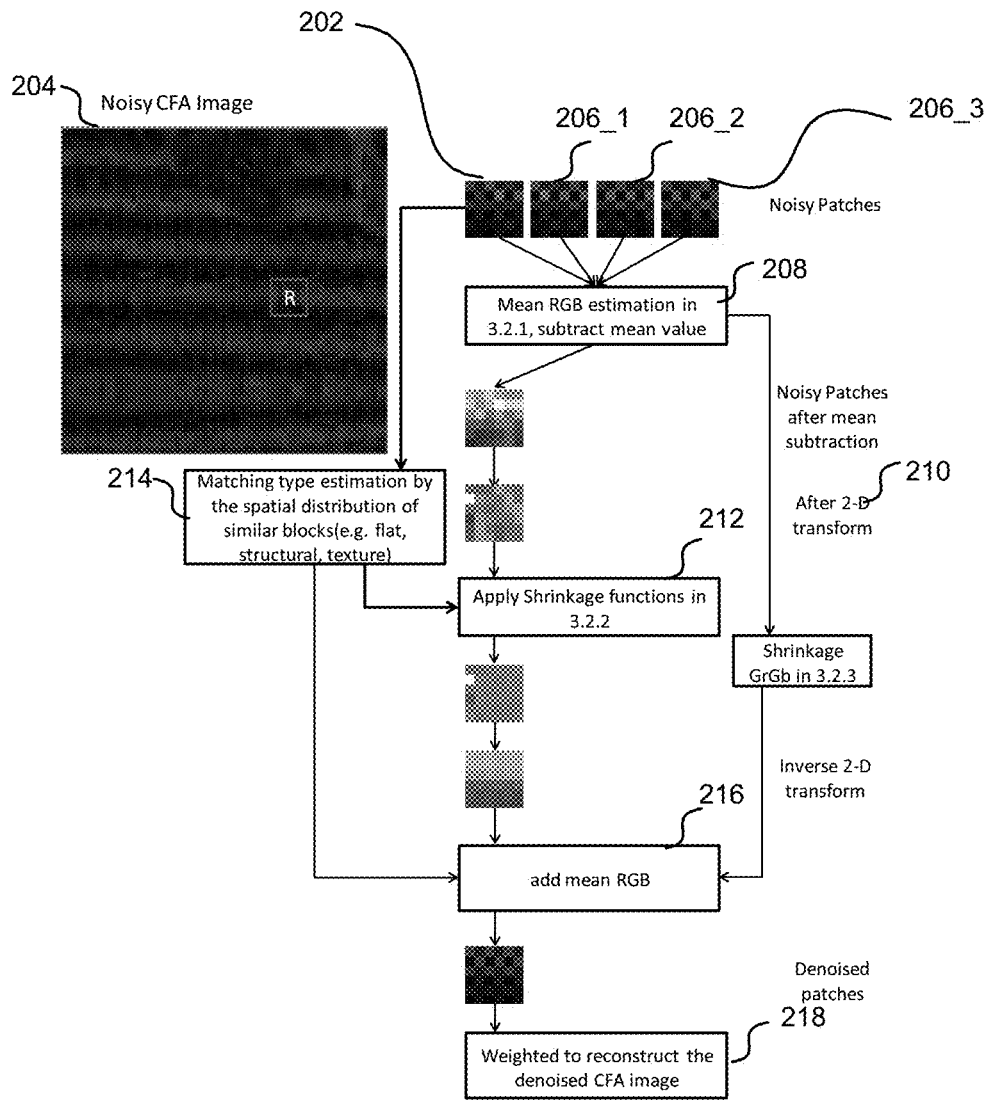
FIG. 2A depicts a diagram of a Block-matching 3D (BM3D) filtering based algorithm with mean Red Green Blue (RGB) estimation and matching type estimation for a Color Filter Array (CFA) image denoising.
FIG. 2B depicts a diagram of the BM3D based algorithm with collaborative filtering (COLF) for the CFA image denoising.
FIG. 2C depicts a diagram of the BM3D based algorithm with the COLF and aggregation for the CFA image denoising.
Figure 2:
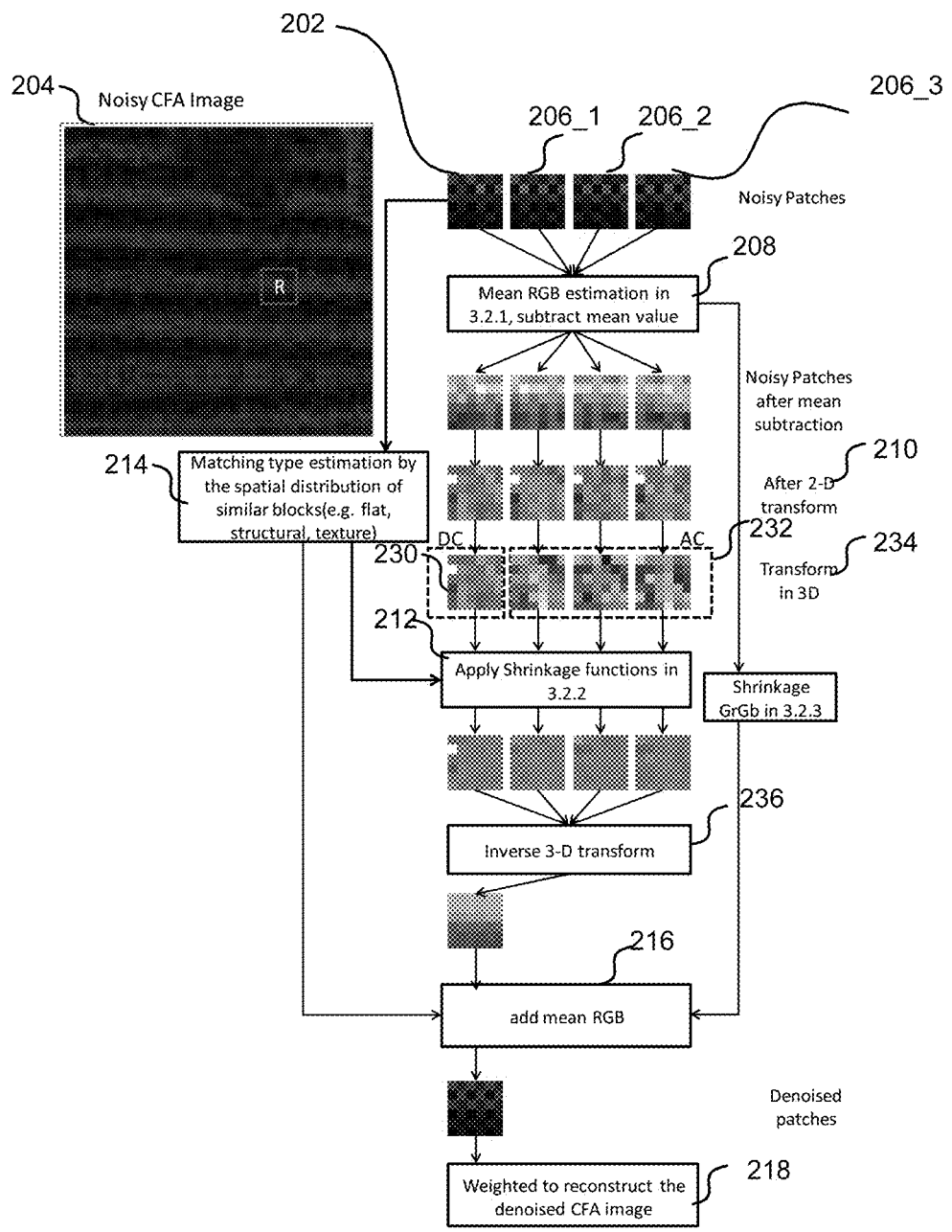
Figure 2:
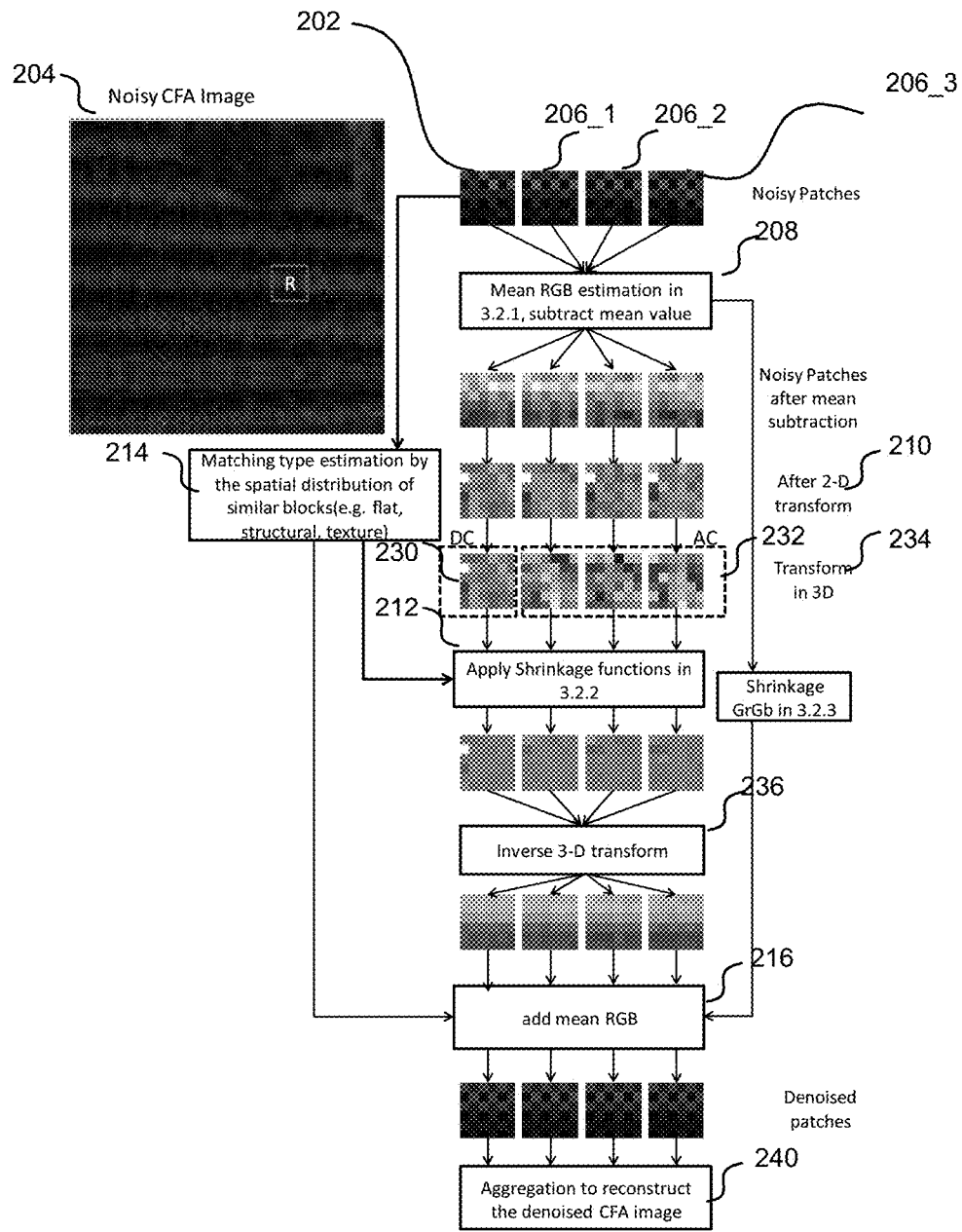

An example of the BM3D filtering based denoising model for processing a noisy patch in a raw CFA image is shown in FIG. 2, with FIG. 2A depicts a diagram of the present invention with mean RGB value estimation 160 and MTE 158 for an CFA image denoising, FIG. 2B depicts the BM3D based algorithm with a collaborative filtering (COLF) for the CFA image denoising, and FIG. 2C depicts the BM3D based algorithm with the COLF and aggregation for the CFA image denoising. In some embodiments, the similar patches are used in mean RGB estimation. In FIG. 2A, a reference patch (R) 202 is selected from a noisy CFA image 204, together with other three similar patches 206 (i.e. 206_1, 206_2 and 206_3) with the same color configurations. In some embodiments, mean RGB value is estimated and subtracted 208 for all the patches 202 and 206 respectively. Next, one or more 2D Transforms 210 are applied to the patches to obtain one or more frequency domain coefficients following with one or more shrinkage functions 212 according with the MTE 214. Mean RGB values are added back to the different frequency domain coefficients respectively 216 after an inverse transform (e.g. 2D-DCT). Finally, perform one or more transformations on the spatial domain coefficients to reconstruct (step 218) a denoised CFA image 204. In some embodiments, Step 218 is performed on the spatial domain by averaging all the denoised patches. In FIG. 2B, Direct Current (DC) coefficients 230 and Alternating Current (AC) coefficients 232 are obtained through the COLF. For example, for a 6×6 pixels patch, there are 36 coefficients in the frequency domain after 2-D DCT transform. In some embodiments, the coefficient at up-left may be used as a DC coefficient, and the rest of coefficients may be used as AC coefficients. In some embodiments, with four patches (202, 206_1, 206_2, 206_3) being processed collaboratively, a 2-D DCT transform 210 may be used first. Then different groups of 1-D transform may be processed for corresponding coefficients in the 2-D DCT transformed domain. For four 6×6 patches, there are 144 coefficients after 3-D transform. The shrinkage function DC coefficients are described in further detail below in connection with FIG. 6D, and the shrinkage function of the AC coefficients are described in further detail below in connection with FIG. 6E.

Besides the same denoising steps in FIG. 2A, A 3-D Transform 234 and inverse 3-D transform 236 may use in the denoising process. In some embodiments, patch averaging or patch aggregation 240, in FIG. 2C, may be applied to the data in order to get a denoised image. In some embodiments, the training SF model 102 may be trained jointly by optimizing the mean square error in the spatial domain. The shrinkage function for mean RGB estimation may use a local strategy. Although this embodiment only shows 2-D DCT transform, it is to be understood that there could be other transforms (e.g. Hadamard transform, Dual-Tree Real/Complex transform, undecimated DCT) to be used in various embodiments. In some embodiments, the COLF process may be applied similar with the BM3D based algorithm in the 3-D transform domain 162. Different coefficients after a Hadamard transform may be used to learn the training SF model 102, including DC coefficients 230 and AC coefficients 232 respectively. In some embodiments, a slicing-transform-based training strategy may also be used for cases of multiple matching types as well as the COLF. The training strategy is extended for the mean RGB value estimation 160 and GrGb correction 168 as well. In some embodiments, after applying the shrinkage function 212 following with the inverse 3-D transform 236, mean RGB value estimation 160 of each channel are added back to the denoised patches. When Gr and Gb values are added back directly, it may result in the grid effect on some flat regions. Therefore, we trained the training SF model 102 for GrGb on the patches with different matching types. An example of the mean RGB value estimation 160 is described in further detail below in connection with FIG. 5. Examples of the COLF application and the GrGb correction 168 are described in further detail below in connection with FIG. 7.

Figure 3:
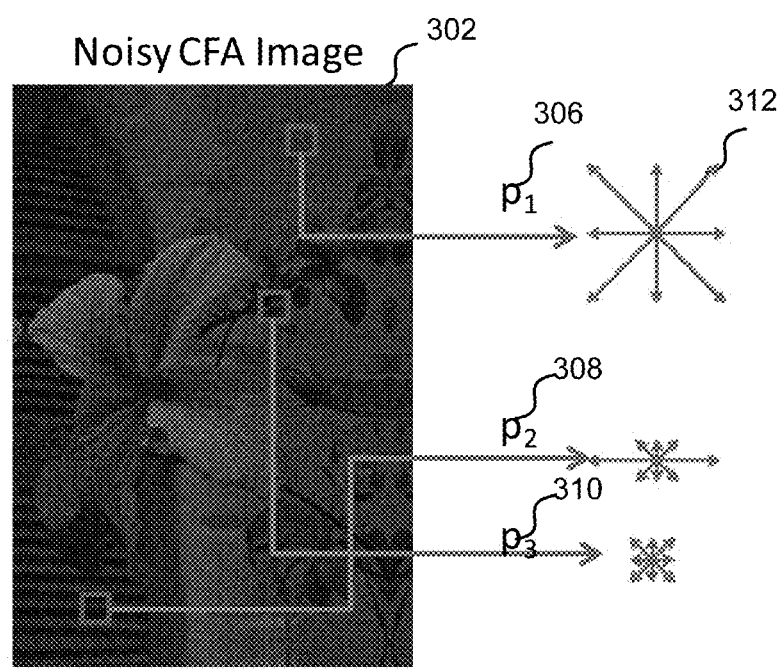
FIG. 3 depicts an example of 8-dimension matching vector for a noisy CFA image, with patch Number 1, 2, 3 represent flat, structural and texture patches correspondingly.

An example of the fast block matching result of a noisy CFA image 302 can be seen in FIG. 3. In some embodiments, instead of searching similar blocks via a brute forcing strategy, block matching is accelerated by only conducting patch comparisons on the Geodesic path of the patches. Therefore, each patch (patch $p_1$ 306, patch $p_2$ 308 and patch $p_3$ 310) may have a 8-D vector 312. In one embodiment, the 8-D vector 312 of Geodesic paths or block distances are calculated for neighbor patches, whereas a moving step of two pixels may be used for Bayer CFA images. Suppose $P_{i,j}$ is the $j^{th}$ patch at direction i, $d_{i,j}$ is the distance between $P_{i,j-1}$ and $P_{i,j}$, $d(P_{i,j})$ is the distance of current patch with $P_{i,j}$, we have:

$$d(P_{i,j})=\max(d(P_{i,j-1}),d_{i,j})+c, \quad (1)$$

Where $c=\kappa n^2 \sigma^2$ is a constant. In some embodiments, this 8-D vector can be used for matching type estimation. For example, patch $p_1$ 306, patch $p_2$ 308 and patch $p_3$ 310 are selected as flat, structural and texture patches respectively. In some embodiments, spatial distribution of the similar patches, and the gradient information may be used for matching type estimation.

Figure 4:
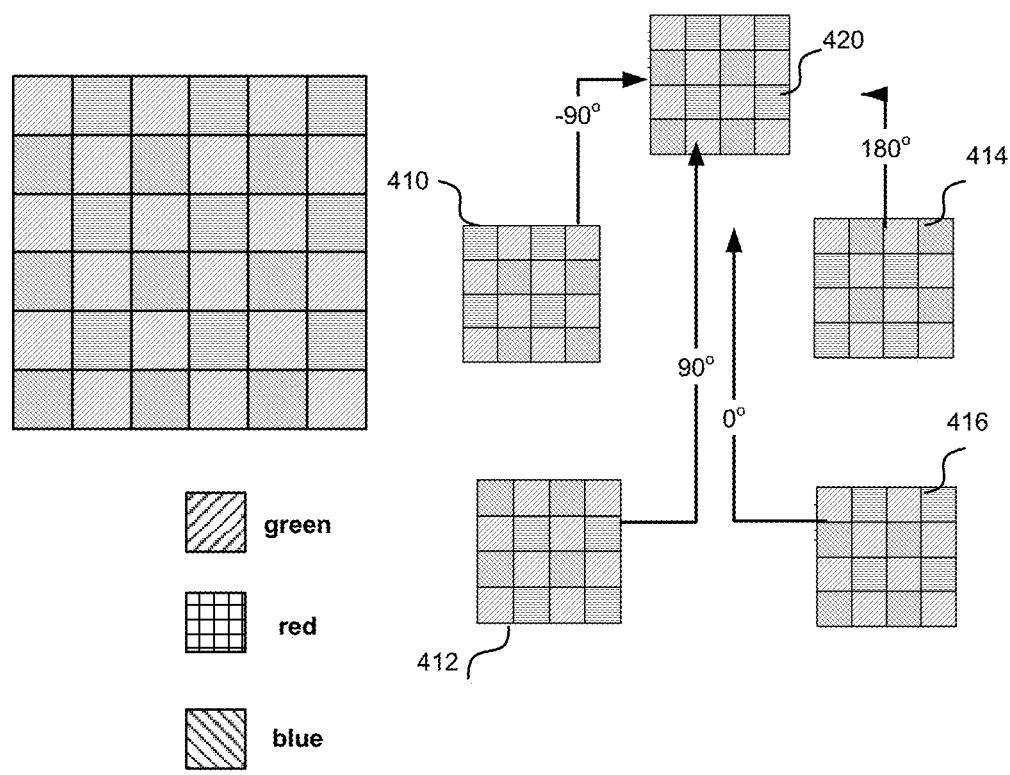
FIG. 4A depicts a rotation process of a block matching algorithm for a Bayer image.
FIG. 4B depicts a 3-dimension transform performed on a reference patch and its similar patches.
Figure 4:
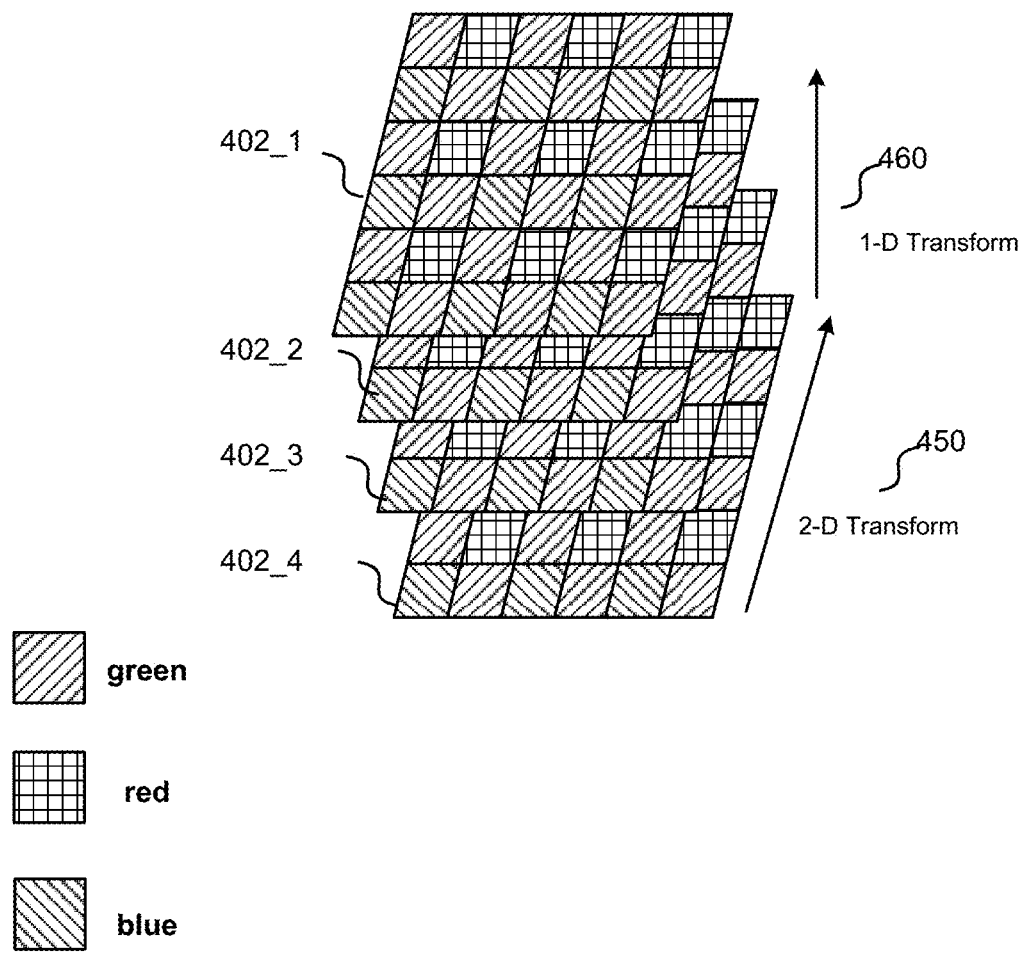

Certain implementations of the present invention utilize cross-color correlations. For example, a restriction is made that only the patches with same RGB color configurations are grouped for searching similar patches for an image and following with the COLF process. As the filter exploits all the color components simultaneously, hence the term is cross-color filtering, which is detailed in Danielyan, Vehvilainen, Kathovnik & Egiazarian, "Cross-color BM3D filtering of noisy raw data", LNLA, 125-129, 2009 (the entire disclosure of which is hereby incorporated by reference). In order to avoid grid effect in the denoised result, a rotation process for the patches with different color configurations may be introduced. For example, in FIG. 4A, a patch red (R) represents the patch whose top-left corner block is red. Instead of using the patch with the same color configurations (e.g. patch R and patch D), all patches (e.g. patch A 410, patch B 412, patch C 414 and patch D 416) may be selected in the fast BM 110 and 156 model after a rotation operation of the patch A 410, patch B 412 and patch C 414 with degrees of −90°, 90° and 180° respectively. This modified matching strategy may be applied in the fast BM 110 and 156 models. For example, in the east (i.e. right-side of horizontal) direction, we need to calculate the patch distance between R 420 and D 416, D and F as well as the patch distance between R 420 and A 410, A 410 and E. FIG. 4B depicts a 3-dimension transform performed on a reference patch and its similar patches. These similar patches are selected using a fast block matching algorithm. In FIG. 4B the similar patches 402 with same color configurations are grouped for the 3-D transform 162 and 234. The 3D transform domain may comprise a 2 dimensional discrete cosine transform (2D-DCT) or a 2 dimensional discrete wavelet transform (2D-DWT) 450 following with a 1-D Haar transform 460, and/or the like. In some embodiments, the MTE 158 may be made relying on the spatial distribution of the similar patches 402 (i.e. Fast BM 110 and 156 associated with the Geodesic distances), with a set of pre-defined or trained decision rules. Given a tolerance τ, after an 8-direction fast matching process, the patches with a distance less than τ are selected as similar patches. Therefore, an 8-D matching vector V 312 represents a number of matching blocks for each direction. This 8-D matching vector V 312 may be used during the MTE 120 and 158. For example, a denoising patch may be divided into three matching types (e.g. flat, structural and texture regions). The patches with similar patches 402 in all neighbor directions are considered as a flat region, whereas unique patches with no similar patches are classified as texture region. The structural regions may be further divided into different sub-categories, where the similar patches 402 are found along different directions. It is to be understood that there may be other matching types in various embodiments.

In some embodiments, a Slicing Transform (SLT) based training strategy may also be used for the case of multiple matching types as well as the COLF process. In some embodiments, the SLT refers to a linear transform where a signal x is represented as a linear combination of column vectors of matrix $S_q(x)$, which is detailed in Y. Hel-Or, D. Shaked, "A discriminative approach for wavelet shrinkage denoising, *IEEE Tran. on image processing*, 17(4), 443-457, 2008. In the SLT, weights of vector q are fixed while transform matrix may vary. After adding a constraint on symmetry of a mapping function as well as an unmodified setting on out-of-the-range coefficients, a vectorial form of SLT is defined as follows:

$$x = S_q(x)q + h \quad (2)$$

where $q = [q_0, q_1, \ldots, q_M]^T$ divides an interval [0,b) into M bins such that $0 = q_0 < q_1 < \ldots < q_M = b$, h is an out-of-the-range coefficient. Each value in vector x is associated with a single bin $\pi(x) \in \{0, 1 \ldots M\}$, where 0 represents values outside of interval [0,b). A corresponding normalized residue r(x) is:

$$\pi(x) = \begin{cases} j & |x| \in [q_{j-1}, q_j) \\ 0 & \text{else} \end{cases} \quad (3)$$

$$r(x) = \begin{cases} \dfrac{|x| - q_{\pi(x)-1}}{q_{\pi(x)} - q_{\pi(x)-1}} & \pi(x) \neq 0 \\ 0 & \text{else} \end{cases}$$

Thus, a N×(M−1) matrix $S_q(x)$ is:

$$[S_q(x)](i, j) = \begin{cases} \text{sign}(x_i)(1 - r(x_i)) & j = \pi(x_i), 1 \leq j \leq M-1 \\ \text{sign}(x_i)r(x_i) & j = \pi(x_i)+1, 1 \leq j \leq M-1 \\ 0 & \text{else} \end{cases} \quad (4)$$

Whereas the out-of-the-range coefficient h is defined as:

$$h_i = \begin{cases} b\,\text{sign}(x_i)r(x_i) & \pi(x_i) = M \\ x_i & \pi(x_i) = 0 \\ 0 & \text{else} \end{cases} \quad (5)$$

In some embodiments, a unique property of the SLT is a substitution property, where a boundary vector q is substituted by a different vector p1×(M−1). In this case, a piecewise linear mapping process may be performed on x:

$$M_{q,p}\{x\} = S_q(x)p + h \quad (6)$$

In some embodiments, the SLT is a spline-based representation in which non-linear mapping operations are applied linearly. Therefore optimization problems may be solved in the least square form. In a defined SLT, the mapping values outside interval [0,b) may not be changed. In some embodiments, amplification may be needed for the out-of-the-ranges coefficients (e.g. deblurring and/or enhancement). Therefore, the out-of-the-range coefficient h may be cancelled and/or removed. The revises Eq. (3) and Eq. (4) can be quantified precisely as:

$$\pi(x) = \begin{cases} j & |x| \in [q_{j-1}, q_j) \\ 0 & \text{else} \end{cases} \quad (7)$$

$$r(x) = \begin{cases} \dfrac{|x| - q_{\pi(x)-1}}{q_{\pi(x)} - q_{\pi(x)-1}} & \pi(x) \neq 0 \\ \dfrac{|x| - q_{M-1}}{q_M - q_{M-1}} & \text{else} \end{cases}$$

Thus, the N×M matrix $S_q(x)$ is:

$$[S_q(x)](i,j) = \begin{cases} \text{sign}(x_i)(1 - r(x_i)) & \begin{array}{l} j = \pi(x_i), 1 \leq j \leq M-1 \text{ or} \\ \pi(x_i) = 0, j = M-1 \end{array} \\ \text{sign}(x_i)r(x_i) & \begin{array}{l} j = \pi(x_i)+1, 1 \leq j \leq M-1 \text{ or} \\ \pi(x_i) = 0, j = M \end{array} \\ 0 & \text{else} \end{cases} \quad (8)$$

In some embodiments, the SLT may be used to learn the training SF model 102 in the CFA image denoising. Other modifications (e.g. add the regularization term to stabilize the solution) may also be considered as well. Except for the coefficient shrinkage 164 in the transform domain, SLT is used for mean RGB value estimation 160 and the GrGb correction 168 as well. In some embodiments, both the MTE 120 and 158 and the COLF are integrated.

In some embodiments, Bayer CFA image may not be considered as a smooth image, which is a precondition of most of wavelet based denoising algorithms. Therefore, in the noisy patch, the mean values of each color channel are estimated and subtracted beforehand. In order to improve accuracy of the estimation, the mean RGB values of the similar patches as mentioned previously may be used jointly in the mean RGB value estimation 160. In some embodiments, a local strategy is applied in the training process for the mean RGB value estimation 160. Suppose for a patch $p_k$, its corresponding mean value in color channel R, Gr, Gb and B are represented as $mr_k$, $mgr_k$, $mgb_k$ and $mb_k$. Using the fast block matching, a number of similar patches, $p_{k,1}, \ldots, p_{k,s}$, $s \in \{0, 1, 3, 7\}$ with mean values $mr_{k,s}$, $mgr_{k,s}$, $mgb_{k,s}$ and $mb_{k,s}$ are selected. In some embodiments, the weighted mean via a least square training scheme on the clean and noisy images can be used instead for $mr_{k,s}$, $mgr_{k,s}$, $mgb_{k,s}$ and $mb_{k,s}$. In some embodiments, two strategies may be used to predict the mean RGB value estimation 160. In one solution, the shrinkage function 212 is operated on the coefficients after a Hadamard transform whereas in another solution, an alternative opinion is to apply the coefficient shrinkage 164 on differential values instead. For example, suppose there are three similar patches, when the red channel is estimated, a 4-D vector is obtained after a Hadamard transform. In some embodiments, a scalar value is predicted based on the mean red colors in the similar patches. The shrinkage curve may be applied on the transformed data.

Figure 5:
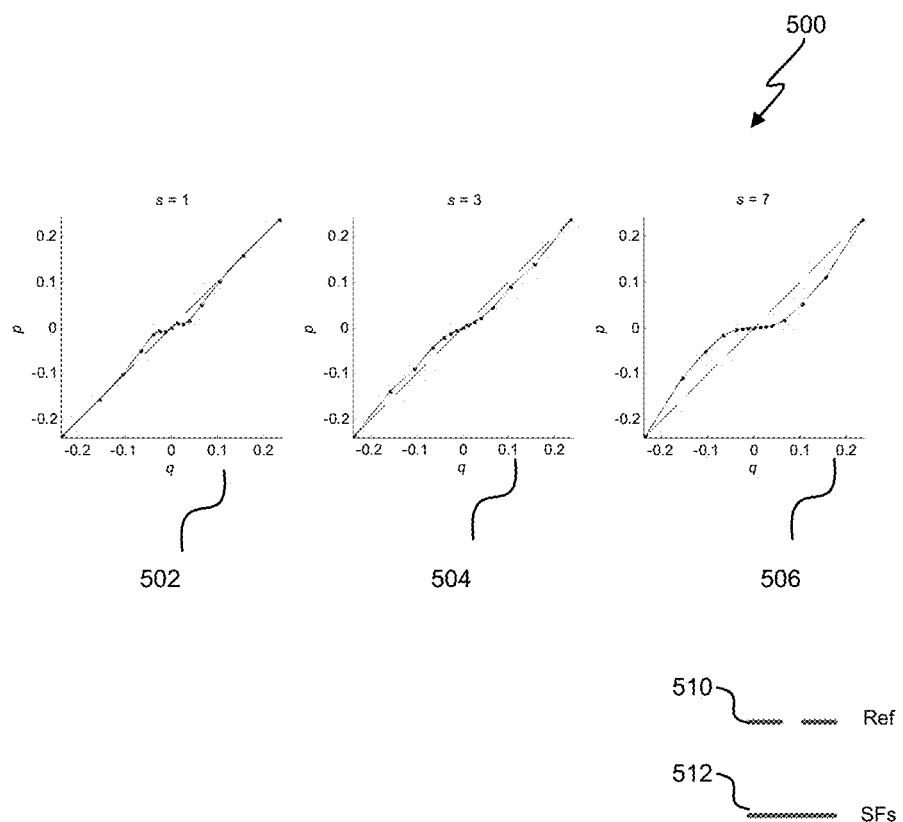
FIG. 5A illustrates an example of the training SF model on a mean estimation of red color (R) channel using a set of values from a Hadamard transform.
FIG. 5B illustrates an example of the training SF model on the mean estimation of R channel using a set of differential values.
Figure 5:
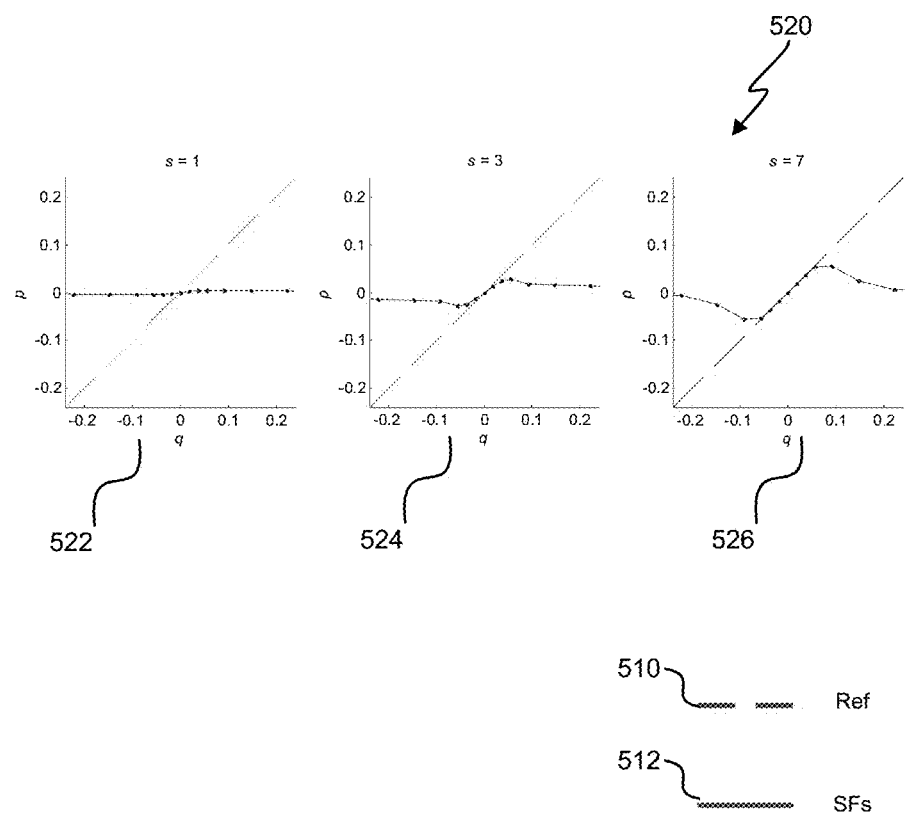

An example of the training SF model 102 for R channel on a Kodak set with patch size of 6×6 pixels is shown in FIG. 5, with the results of s=1 (502), s=3 (504) and s=7 (506), where s is the number of similar patches. In some embodiments, the shrinkage function 212 may be performed after the Hadamard transform, as the result shown in FIG. 5A.

For example, suppose patch $p_k$ has a mean value $mr_k$ in the color channel R, similar patches with mean value $mr_{k,j}$ (j=1, . . . , s) are selected. After a Hadamard transform on the vector $x_{mrk}=[mr_k, mr_{k,1}, \ldots, mr_{k,s}]^T$, $x_{mrk}{}^H = Hx_{mrk}=[m_{rk,0}{}^H, m_{rk,1}{}^H, \ldots, m_{rk,s}{}^H]^T$ can be derived. Here, m is considered as an out-of-the-range coefficient without any modifications by the shrinkage functions. For $m_{rk1,1}{}^H, \ldots, m_{rk,s}{}^H$, the same shrinkage function 212 is applied. For example, the training SF model 102 in R channel is learned by minimizing the following cost function:

$$F_{R,s} = \sum \|mr_k^0 - T_{s1}(H^T)S(x_{mrk}^H)p\|_2^2 + \lambda\|p - q\|_2^2 \quad (9)$$

where $mr_k^0$ is a mean value in the R channel of clean patches. $T_{si}$ is an operator for extracting the $i^{th}$ row of a vector or matrix, A is a regularization parameter. If M bins are selected, twelve (M−1) dimensional vectors will be trained. Here, the boundary vector p has a closed-form solution in this least square optimization problem. After vector p is optimized, the estimated value of R channel is calculated by:

$$mr_k^{est}=T_{s1}(H^T)S(x_{mrk}^H)p \quad (10)$$

In other embodiments, the coefficient shrinkage 164 may be performed with differential values as a modification, the differential values may refer to the values $mr_{k,1}-mr_k, \ldots, mr_{k,s}-mr_k$ as the results shown in FIG. 5B, with s=1 (522), s=3 (524) and s=7 (526). Same shrinkage function may be applied for these differential values by minimizing the cost function as described previously. In this case, the estimated value for R channel is:

$$mr_k^{est} = mr_k + \frac{1}{s+1}\sum_{l=1}^{s} S(mr_{k,l} - mr_k)p \quad (11)$$

In some embodiments, instead of minimizing the mean square error in the training SF model 102), modifications may be made on a cost function (i.e. perceptual fidelity aware mean square error).

Figure 6:
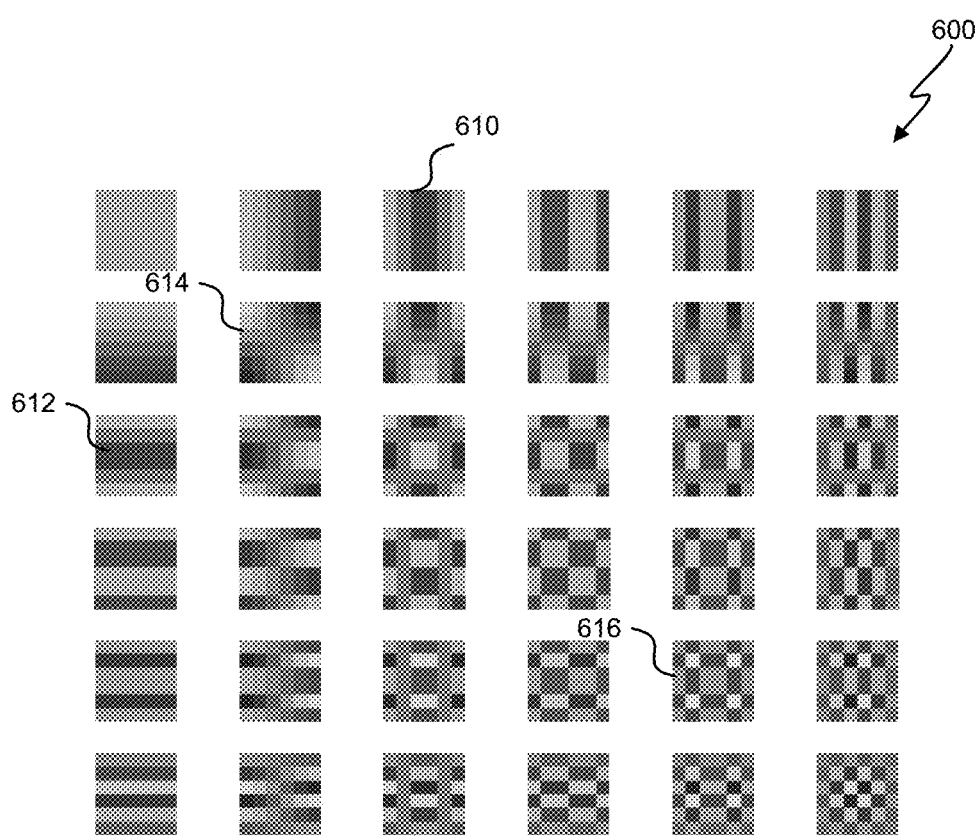
FIG. 6A depicts a dictionary basis for DCT transform of 6×6 pixels.
FIG. 6B depicts results of the trained SF model with Direct Current (DC) coefficients in 1-D transform on flat patches.
FIG. 6C depicts results of the trained SF model with DC coefficients in 1-D transform on texture patches.
FIG. 6D depicts results of the trained SF model with DC coefficients in 1-D transform on structural patches.
FIG. 6E depicts results of the trained SF model with Alternating Current (AC) coefficients in 1-D transform on the flat patches.
FIG. 6F depicts results of the trained SF model with AC coefficients in 1-D transform on the structural patches.
FIG. 6G depicts results of the trained SF model with DC coefficients in 1-D transform on the vertical structural patches.
FIG. 6H depicts results of the trained SF model with DC coefficients in 1-D transform on the horizontal structural patches.
Figure 6:
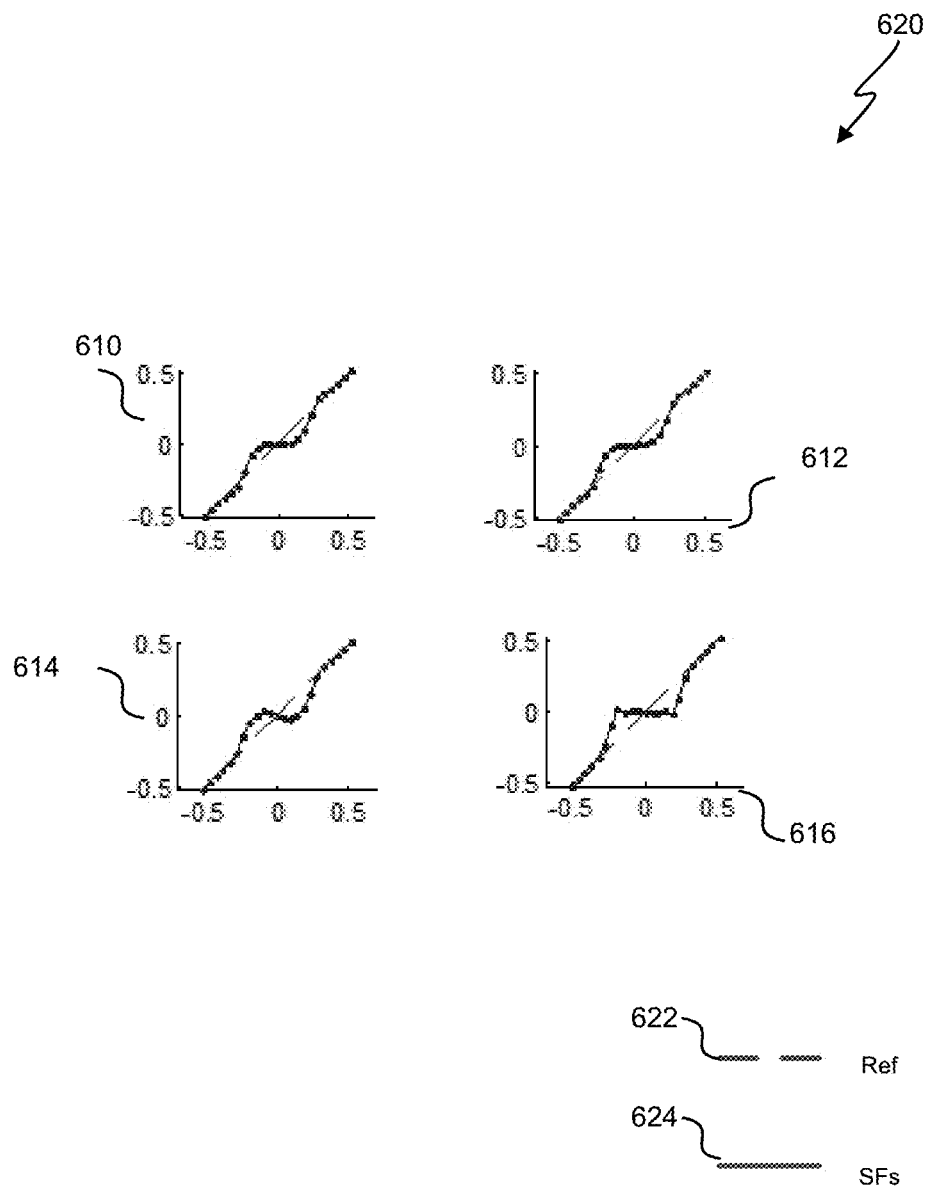
Figure 6:
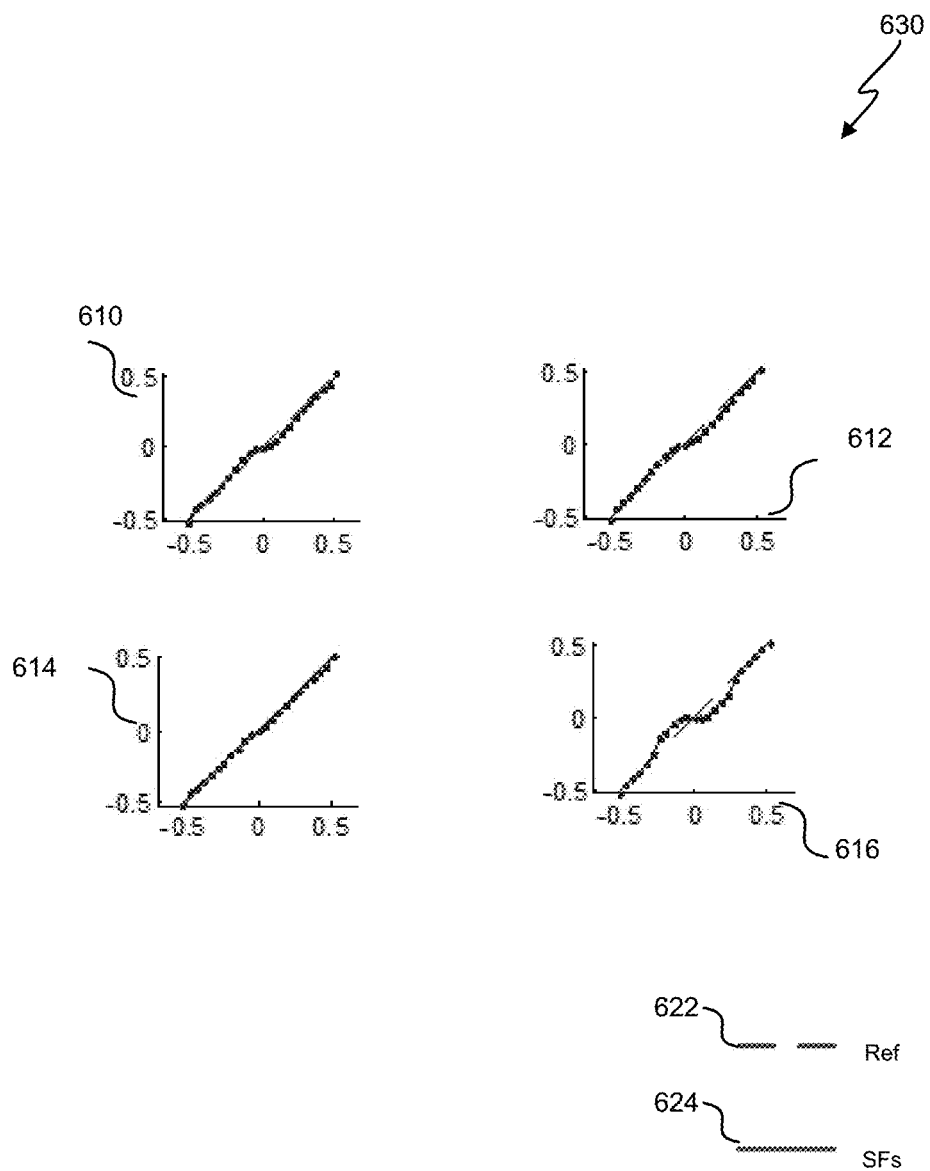
Figure 6:
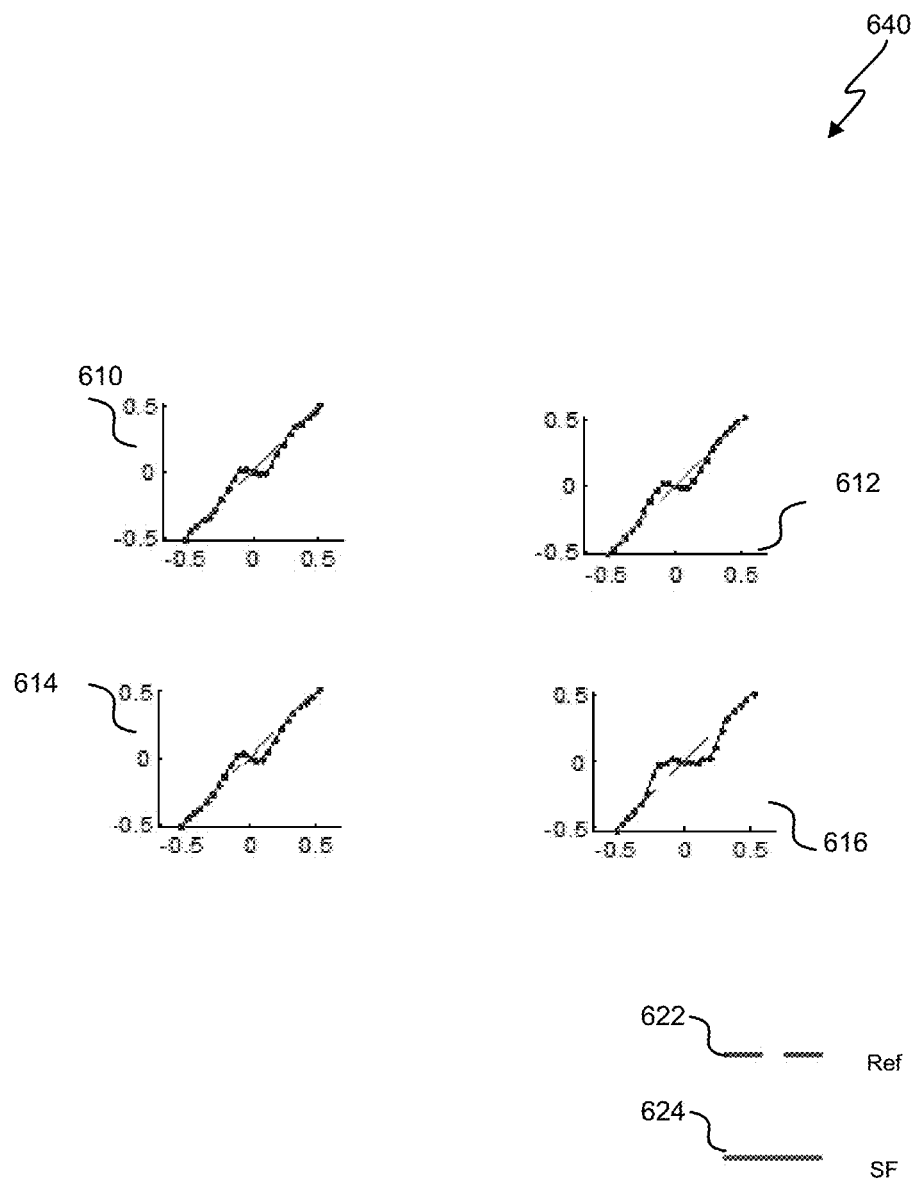
Figure 6:
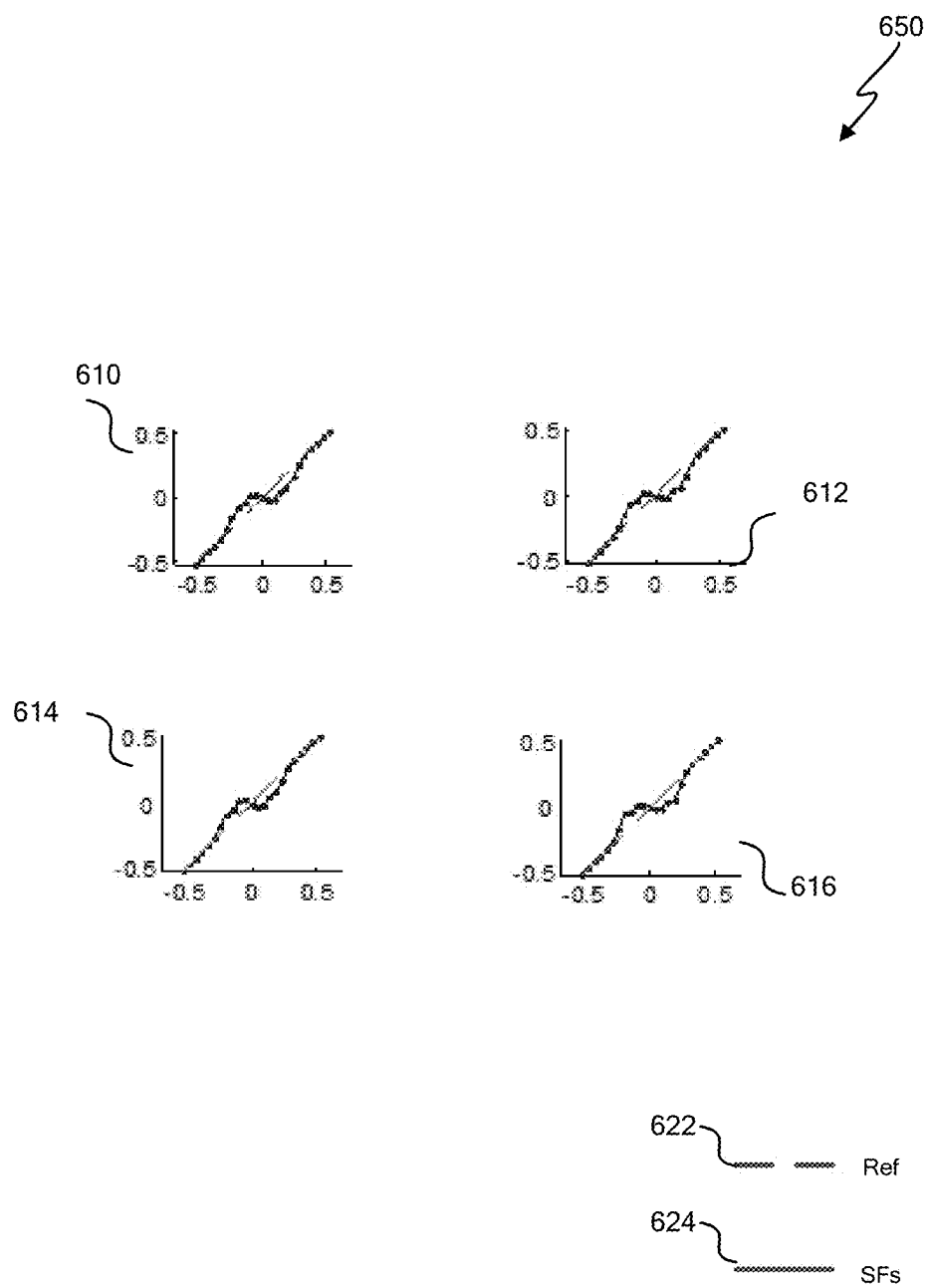
Figure 6:
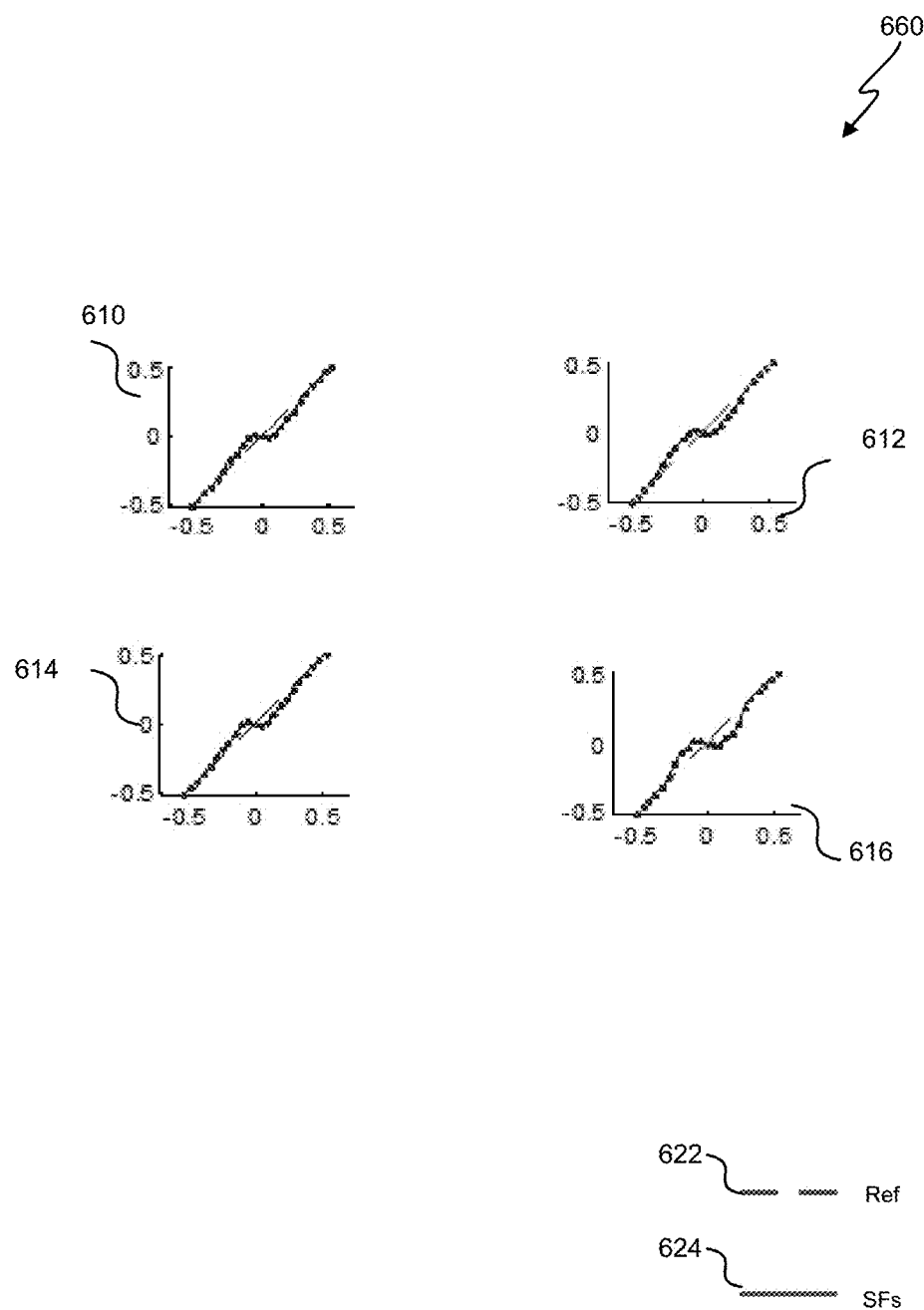
Figure 6:
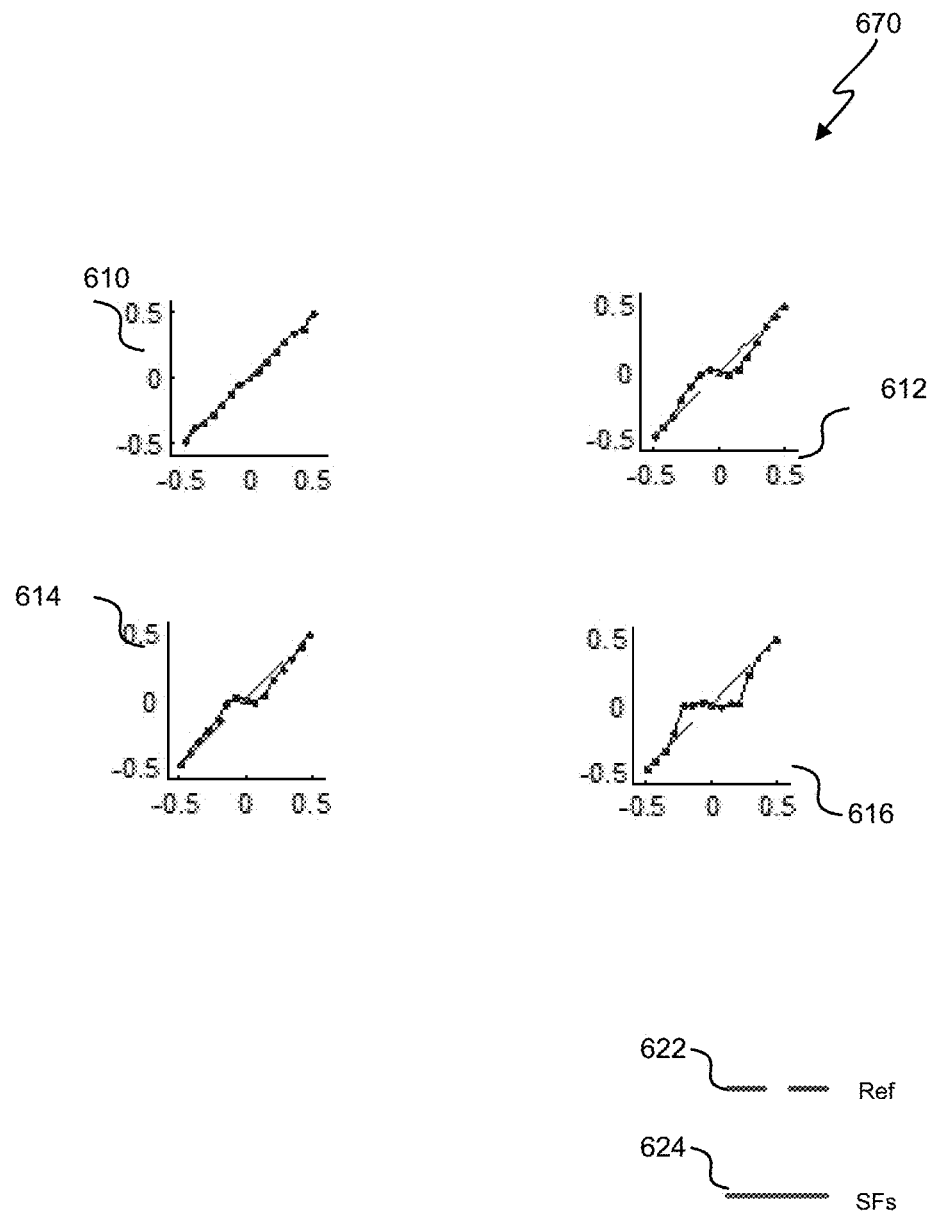
Figure 6:
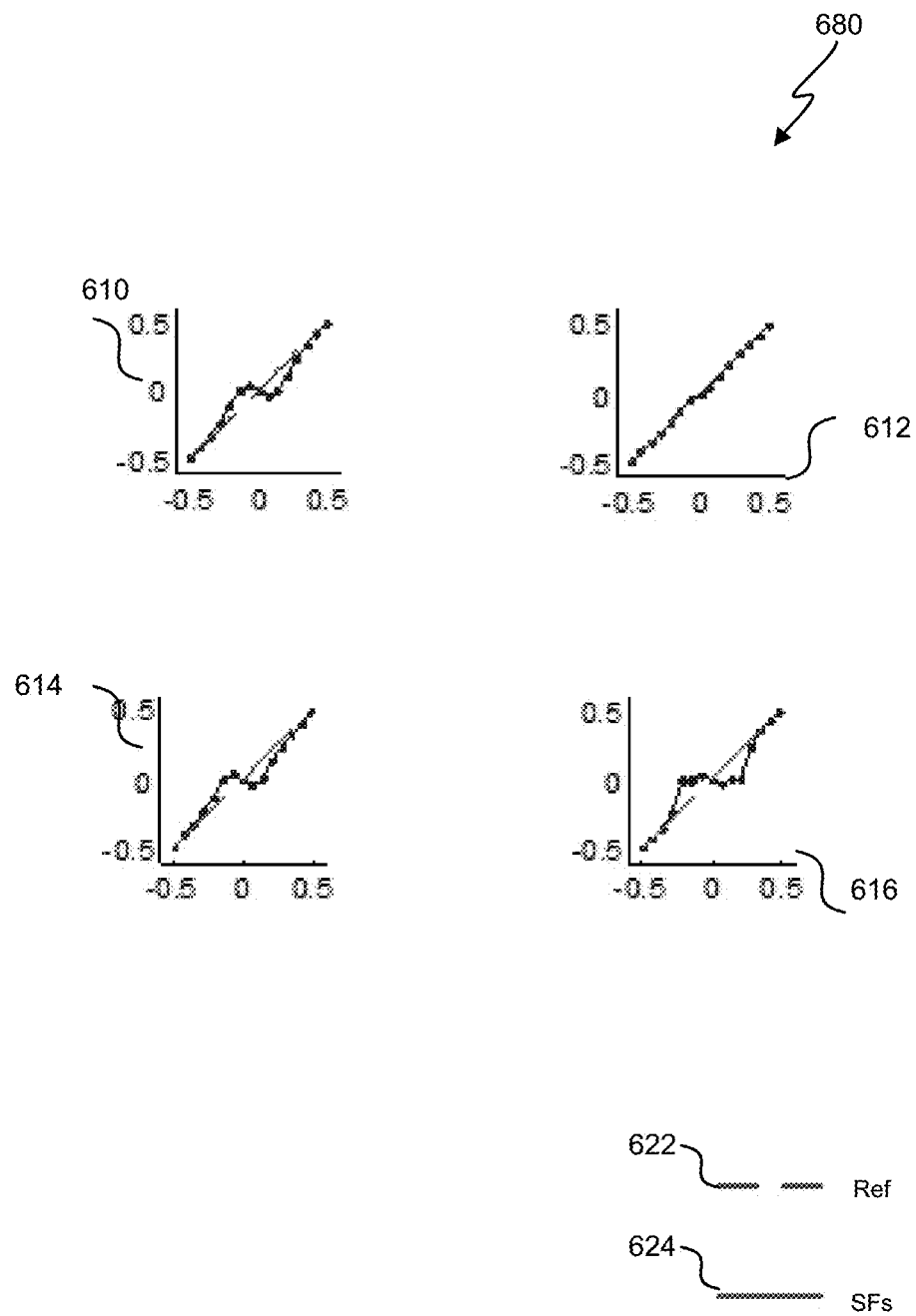

In some embodiments, with a pre-defined number of matching types c for an n×n pixels patch, there is n×n×c×(M−1) training parameters. An example of the training SF model 102 is shown in FIG. 6, with FIG. 6A depicts an example of a dictionary basis for DCT transform of 6×6 pixels. FIG. 6B results of the trained SF model with Direct Current (DC) coefficients in 1-D transform on flat patches 620, FIG. 6C depicts results of the trained SF model with DC coefficients in 1-D transform on texture patches 630, FIG. 6D depicts results of the trained SF model with DC coefficients in 1-D transform on structural patches 640, FIG. 6E depicts results of applying training SF model with Alternating Current (AC) coefficients in 1-D transform on flat patches 650, FIG. 6F depicts results of the trained SF model with AC coefficients in 1-D transform on structural patches 660, FIG. 6G depicts results of the trained SF model with DC coefficients in 1-D transform on the vertical structural patches, and FIG. 6H depicts results of the trained SF model with DC coefficients in 1-D transform on the horizontal structural patches. In FIG. 6A, four patches or dictionary bases 610, 612, 614, 616 are selected to illustrate different features, and their corresponding shrinkage curves are shown in FIG. 6B-FIG. 6H respectively, i.e. four patches or dictionary bases 610, 612, 614, 616. In FIG. 6B-FIG. 6H, x axis represents frequency coefficients, and y axis represents shrinkage coefficients. In some embodiments, structural patches are further classified as vertical, horizontal and other types. It is to be noted that depending on the underlying image, the shrinkage function 212 applies different curves. In some embodiments, the training SF model 102 may be performed for estimating mean RGB values with COLF. The training SF model 102 may be applied when multiple similar patches 402 are denoised collaboratively. For example, if the shrinkage function 212 is executed on the values after a Hadamard transform, $x_{mrk}^0=[m_{rk,0}^0, m_{rk,1}^0, \ldots, m_{rk,s}^0]^T$ is a set of mean values of the clean images, the cost function is modified as:

$$F_{R,s,COLF} = \sum \|x_{mrk}^0 - H^T S(x_{mrk}^H)p\|_2^2 + \lambda\|p - q\|_2^2 \quad (12)$$

Note that the number of the training parameters will not be changed.

In some embodiments, the shrinkage function 212 may show more smoothing effect for flat patches or regions. For texture patches or regions, the coefficients may be less shrinked in order to maintain more texture contents. For structural patches or regions, the coefficients corresponding to the edge information may be less shrinked. In some embodiments, if the structural patches along horizontal and vertical direction are trained separately, an edge preserving effect may be observed only along the edge direction. In some embodiments, the training SF model 102 for the coefficients in the transform domain is similar to the spatial distribution method, which is detailed in Takeda, Farsiu, & Milanfar, "Kernel regression of image processing and reconstruction", *IEEE Tran. on image processing,* 16(2), 349-366, 2007. As additional matching types are added, different SF models may be trained for the patches with different matching types respectively. For example, suppose $p_{kn}$ and $p_{kn}^0$ are the noisy and the clean patches respectively at position k after the mean RGB values are subtracted, D is the 2-D DCT transform 450, the cost function can be defined as:

$$F = \left\|\sum R_k^T p_{kn}^0 - \sum R_k^T(T_{sj}(D))^T S_{fq}(T_{sj}(Dp_{kn}))p\right\|_2^2 + \lambda\|p - q\|_2^2 \quad (13)$$

$$\text{Where } S_{fq}(x) = \begin{bmatrix} S_1(x) & \cdots & & 0 \\ & S_2(x) & \cdots & 0 \\ \vdots & \vdots & \ddots & 0 \\ 0 & 0 & 0 & S_c(x) \end{bmatrix},$$

$$S_i(x) = \begin{cases} S(x) & MT(p_k) = i \\ 0 & \text{else} \end{cases},$$

where $MT(p_k)$ is the matching type of patch $p_k$. $R_k \in R_k \in R^{M \times n^2}$ is an operator that extracts the $k^{th}$ patch, (i.e. $p_k=R_ky$). In some embodiments, following modifications are made in the optimization process when the COLF is considered:

(1) Values from the Hadamard transform or difference values may be used instead of Haar. In this embodiment, the number of training parameters for the shrinkage coefficient is only two times comparing with the method defined in Eq. 13, which is not related to the number of selected similar patches. For example, for a patch with three selected similar patches, after a Hadamard transform, the DC coefficients 230, and the three AC coefficients 232, are divided into two groups and the shrinkage coefficients are trained respectively.

(2) In some embodiments, the noisy patches may be classified into different matching types using the result of the fast BM 110 and 156. Different number of similar patches is then selected for the COLF. For example, seven similar patches are selected on the flat matching types, whereas three patches for the structural matching types, whereas no additional patches are selected for the texture matching types.

(3) Different mean RGB values are subtracted beforehand as defined in Eq. 10. Suppose $p_{kn}$ and $p_{kn}^0$ are $n^2 \times 1$ vectors, which are the noisy and clean patches respectively at position k, the selected similar patches are $p_{k,1}, \ldots, p_{k,s}$ and $p_{kn,1}^0, \ldots, p_{kn,s}^0$, where $s \in \{0, 3, 7\}$. When $MT(p_k)=j$, the number of selected similar patches is $s[j]$. Therefore, the cost function for training the coefficient j is:

$$F = \left\| \sum R_k^T p_{kn}^0 - \sum R_k^T D_{MT(p_k)}^{i3D} S_{fq}(U_k) p \right\|_2^2 + \lambda \|p - q\|_2^2 \quad (14)$$

where $$U_k = (D_{MT(p_k)}^{3D})^T [ p_{kn}^T \ p_{k,1}^T \ \cdots \ p_{k,s[MT(p_k)]}^T ]^T$$

$$D_t^{3D} = (kron(H_{s[t]+1}, D^T))^T$$

$$D_t^{i3D} = kron\left( \frac{1}{(s[t]+1)^2} \underbrace{[1 1 \ldots 1]}_{N s[t]}, D^T \right)$$

In some embodiments, for all the similar patches, after shrinkage function 212 and inverse 3-D transform 162 and 234, the patch aggregation 240 is applied where all the patches are added back to the denoised image. Therefore, Rk and $D_t^{i3D}$ may be revised as:

$$R_k^{*T} = [ R_k^T; \ R_{k,1}^T; \ \ldots \ R_{k,s[MT(p_k)]}^T ] \quad (15)$$

$$D_t^{i3D} = kron\left( \frac{1}{(s[t]+1)^2} H_{s[t]}^T, D^T \right)$$

where function kron( ) is the Kronecker product.

Figure 7:
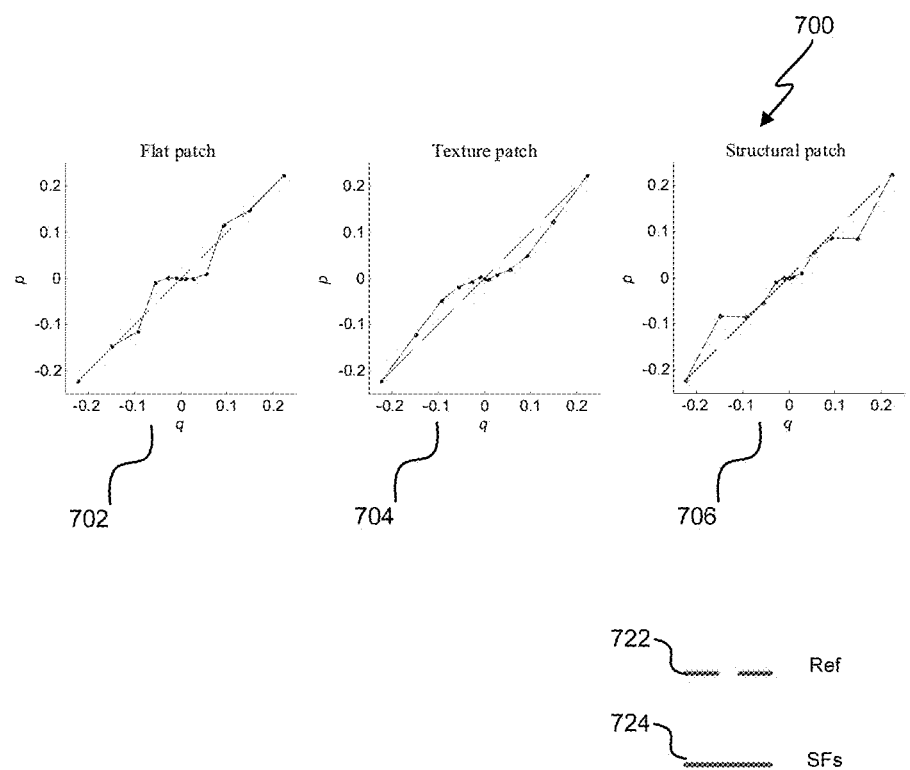
FIG. 7 illustrates results of applying the trained SF model with green-red green-blue (GrGb) correction.

An example of the training SF model 102 with GrGb correction 168 is shown in FIG. 7. Results 700 include the results of flat patch 702, texture patch 704, and structural patch 706. In some embodiments, after applying the shrinkage function 212 following with an inverse transform 172, mean RGB value estimation 160 of each channel are added back to the denoised patches. When Gr and Gb values are added back directly, it may result in the grid effect on some flat regions. Therefore, we trained the training SF model 102 for GrGb on the patches with different matching types. In some embodiments, a global training strategy is demonstrated by defining a cost function for the training SF model 102 in GrGb correction 168 as:

$$F_{grgb} = \quad (16)$$

$$\left\| \sum R_{k,Grgb}^T \left( p_k^0 - \frac{mgr_k + mgb_k}{2} - p_{ks}^{dn} \right) - \sum S_{grgb} \left( \frac{mgr_k + mgb_k}{2} \right) p \right\|_2^2 + \lambda \|p - q\|_2^2$$

where $S_{grgb}(x) = \begin{bmatrix} S_1(x) & \cdots & & 0 \\ & S_2(x) & \cdots & 0 \\ \vdots & \vdots & \ddots & 0 \\ 0 & 0 & 0 & S_c(x) \end{bmatrix}$, $$S_i(x) = \begin{cases} S(x) & MT(p_k) = i \\ 0 & \text{else} \end{cases}$$

where $p_{ks}^{dn}$ is the denoised patch $p_{ks}$, $R_{k,GrGb}$ is all operator that extracts pixels in Gr/Gb positions for the $k^{th}$ patch. In this embodiment, the shrinkage coefficients of the training SF model 102 can be learned from the proposed three step method, which comprises mean RGB estimation, coefficient training in frequency domain and GrGb correction.

In some embodiments, this GrGb correction process can be further extended as a color correction scheme. For example, after a transform on the mean color value, the shrinkage functions of the chromatic values mchr1 and mchr2 are also trained.

$$\begin{bmatrix} m_{lum} \\ m_{chr1} \\ m_{chr2} \\ m_{dGrGb} \end{bmatrix} = \begin{bmatrix} 1/2 & 1/2 & 1/2 & 1/2 \\ -1 & 1/2 & 1/2 & 0 \\ 0 & 1/2 & 1/2 & -1 \\ 0 & -1 & 1 & 0 \end{bmatrix} \begin{bmatrix} m_r \\ m_{gr} \\ m_{gb} \\ m_b \end{bmatrix} \quad (17)$$

After the shrinkage process, it is transformed back to get the mean RGB values.

$$\begin{bmatrix} m_r' \\ m_{gr}' \\ m_{gb}' \\ m_b' \end{bmatrix} = \begin{bmatrix} 1/2 & 3/4 & 1/4 & 0 \\ 1/2 & 1/4 & 1/4 & -1/2 \\ 1/2 & 1/4 & 1/4 & 1/2 \\ 1/2 & 1/4 & -3/4 & 0 \end{bmatrix} \begin{bmatrix} m_{lum} \\ m_{chr1}' \\ m_{chr2}' \\ m_{GrGb}' \end{bmatrix} \quad (18)$$

where $m'_{chr1}$, $m'_{chr2}$, $m'_{GrGb}$ are the shrinked values.

In some embodiments, a number of variations and modifications of the disclosed embodiments can also be used. In some embodiments, the present invention can also deal with the Poisson noise image, which results in the robustness for the denoising algorithm even when the VST 154 process may not be 100% accurate. In some embodiments, using the real noise captured by the sensor may achieve better performance for the noisy sample images 106 of the training SF model 102. In the training SF model 102, under different ISO setting, two images under different brightness condition are captured, which are the clean image and the noisy image correspondingly (e.g. under low-light condition). For example, an intrinsic camera response function (CRF) or an intensity mapping function is estimated to map the reference image to the brightness and contrast condition of the noisy image. When an enhancement process is executed beforehand for the reference image, the coefficients with joint denoising and enhancement effect is learned.

In one embodiment, the presented invention may focus on methods and algorithms of optimizing training data set to apply to the training SF model 102; several methods of machine learning or other algorithms can also be applied to this invention for getting initial training data from any data learning literatures.

Figure 8:
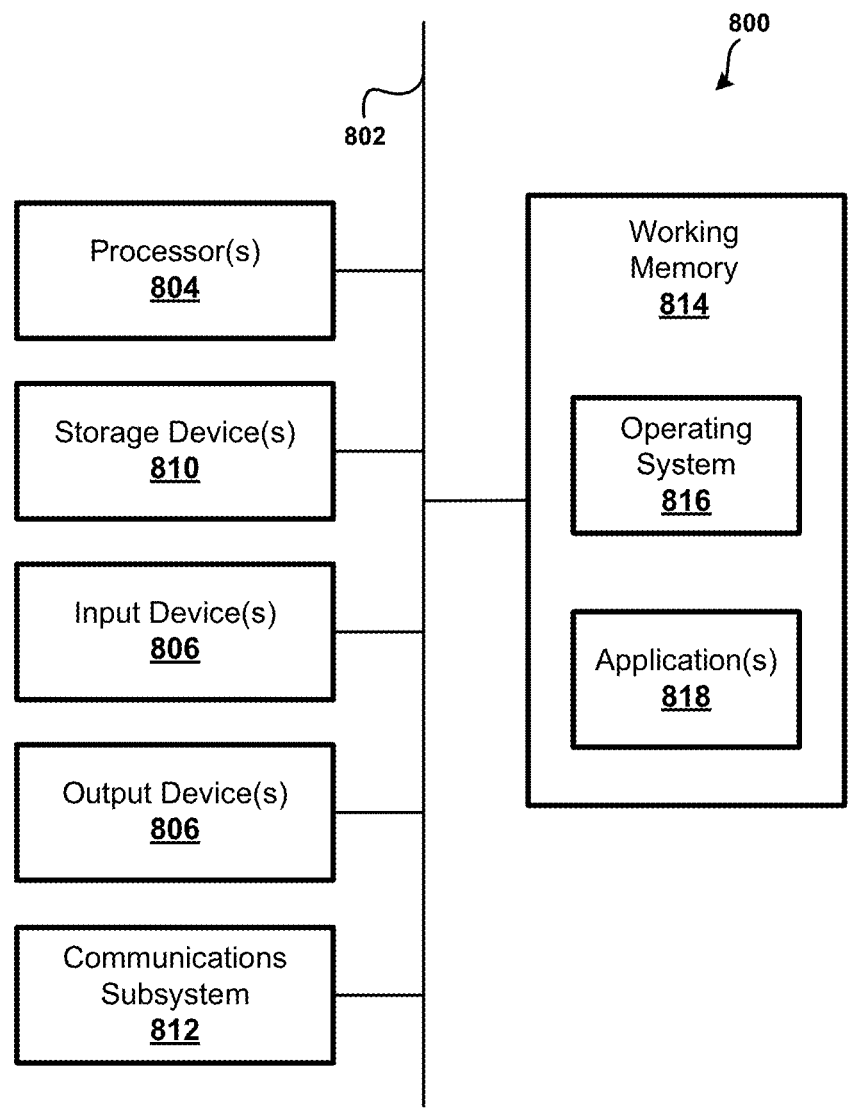
FIG. 8 shows an example computing system or device.

FIG. 8 illustrates an embodiment of an example computer system/device 800. An example of a computer device includes a mobile user equipment or terminal (e.g., smartphone), a server computer, desktop computer, laptop computer, personal data assistant, gaming console, and others. The example computer device 800 may be configured to perform and/or include instructions that, when executed, cause the computer system 800 to perform the example method of FIG. 1. It should be noted that FIG. 8 is intended only to provide a generalized illustration of various components, any or all of which may be utilized as appropriate. FIG. 8, therefore, broadly illustrates how individual system elements may be implemented in a relatively separated or relatively more integrated manner.

The computer device 800 is shown comprising hardware elements that can be electrically coupled via a bus 802 (or may otherwise be in communication, as appropriate). The hardware elements may include a processing unit with one or more processors 804, including without limitation one or more general-purpose processors and/or one or more special-purpose processors (such as digital signal processing chips, graphics acceleration processors, and/or the like); one or more input devices 806, which can include without limitation a remote control, a mouse, a keyboard, and/or the like; and one or more output devices 808, which can include without limitation a presentation device (e.g., television), a printer, and/or the like.

The computer system 800 may further include (and/or be in communication with) one or more non-transitory storage devices 810, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer device 800 might also include a communications subsystem 812, which can include without limitation a modem, a network card (wireless or wired), an infrared communication device, a wireless communication device, and/or a chipset (such as a Bluetooth™ device, an 402.11 device, a WiFi device, a WiMax device, cellular communication facilities (e.g., GSM, WCDMA, LTE, etc.), and/or the like. The communications subsystem 812 may permit data to be exchanged with a network (such as the network described below, to name one example), other computer systems, and/or any other devices described herein. In many embodiments, the computer system 800 will further comprise a working memory 814, which can include a RAM or ROM device, as described above.

The computer device 800 also can comprise software elements, shown as being currently located within the working memory 814, including an operating system 816, device drivers, executable libraries, and/or other code, such as one or more application programs 818, which may comprise computer programs provided by various embodiments, and/or may be designed to implement methods, and/or configure systems, provided by other embodiments, as described herein. Merely by way of example, one or more procedures described with respect to the method(s) discussed above, and/or system components might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 810 described above. In some cases, the storage medium may be incorporated within a computer system, such as computer system 800. In other embodiments, the storage medium might be separate from a computer system (e.g., a removable medium, such as flash memory), and/or provided in an installation package, such that the storage medium can be used to program, configure, and/or adapt a general purpose computer with the instructions/code stored thereon. These instructions might take the form of executable code, which is executable by the computer device 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 800) to perform methods in accordance with various embodiments of the invention. According to a set of embodiments, some or all of the procedures of such methods are performed by the computer system 800 in response to processor 804 executing one or more sequences of one or more instructions (which might be incorporated into the operating system 816 and/or other code, such as an application program 818) contained in the working memory 814. Such instructions may be read into the working memory 814 from another computer-readable medium, such as one or more of the storage device(s) 810. Merely by way of example, execution of the sequences of instructions contained in the working memory 814 might cause the processor(s) 804 to perform one or more procedures of the methods described herein.

The terms "machine-readable medium" and "computer-readable medium," as used herein, refer to any medium that participates in providing data that causes a machine to operate in a specific fashion. In an embodiment implemented using the computer device 800, various computer-readable media might be involved in providing instructions/code to processor(s) 804 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 810. Volatile media include, without limitation, dynamic memory, such as the working memory 814.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 804 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 812 (and/or components thereof) generally will receive signals, and the bus 802 then might carry the signals (and/or the data, instructions, etc. carried by the signals) to the working memory 814, from which the processor(s) 804 retrieves and executes the instructions. The instructions received by the working memory 814 may optionally be stored on a non-transitory storage device 810 either before or after execution by the processor(s) 804.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as any combination of: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for removing noise from an image, the method comprising:
   selecting one or more patches of a first image having a noise profile as a set of noisy patches, each noisy patch having a set of n by n pixels;
   selecting one or more patches of a second image without the noise profile as a set of clean patches, each clean patch having a set of n by n pixels;
   estimating one or more patch types for the set of noisy patches;
   constructing a shrinkage function model based on the one or more patch types and the set of n by n pixels of the noisy patch and the clean patch respectively;
   applying the shrinkage function model to a third image to obtain a set of n by n denoised patches; and
   reconstructing the set of n by n denoised patches to remove noise from the third image.

2. The method for removing noise from an image of claim 1, further comprising selecting one or more patches with the same color configuration.

3. The method for removing noise from an image of claim 1, further comprising selecting one or more patches with different color configurations respectively.

4. The method for removing noise from an image of claim 1, wherein estimating one or more patch types further comprises estimating spatial distribution of the one or more patches of the first image.

5. The method for removing noise from an image of claim 1, wherein estimating one or more patch types further comprises calculating patch distances between one or more adjacent patches of the first image.

6. The method for removing noise from an image of claim 1, wherein the shrinkage function model further comprising n by n shrinkage coefficients for each patch type respectively.

7. The method for removing noise from an image of claim 1, wherein estimating one or more patch types further comprises classifying patch types and grouping similar patch types based on the calculated patch distances.

8. The method for removing noise from an image of claim 7, wherein classifying patch types further comprises a fast block matching algorithm.

9. The method for removing noise from an image of claim 1, wherein estimating the patch types further comprises rotating the first patch and the second patch in order to have a same color configuration of the first patch and the second patch.

10. The method for removing noise from an image of claim 1, wherein estimating patch types further comprises an n-dimensional vector represents number of matched patches in each direction of the fast block matching algorithm.

11. A method for removing noise from an image, the method comprising:

selecting a patch of an image, the patch having a first set of n by n pixels, each pixel having a red green blue (RGB) value;

determining a mean RGB value for the patch;

estimating a patch type for the patch;

subtracting each of the RGB values of the n by n pixels of the patch from the mean RGB value to obtain a second set of n by n pixels;

performing a 2D transformation on the second set of n by n pixels to obtain n by n frequency domain coefficients;

performing a 3D transformation on the n by n frequency domain coefficients for s similar patches to obtain n by n by s 3D coefficients;

obtaining a set of shrinkage functions associated with a noise profile of an image sensor and the patch types of the patch;

performing a shrinkage process using the set of shrinkage functions for the n by n by s set of 3D coefficients to obtain an n by n by s set of denoised frequency domain values;

performing one or more inverse transformations on the n by n by s denoised frequency domain values to obtain an n by n set of denoised pixel values.

12. The method for removing noise from an image of claim 11, wherein the n by n by s set of 3D coefficients further comprising a unique shrinkage curve for each of the n by n by s set of 3D coefficients.

13. The method for removing noise from an image of claim 11, wherein obtaining the set of shrinkage functions further comprises constructing a shrinkage function model.

14. The method for removing noise from an image of claim 13, wherein the shrinkage function model further comprising n by n shrinkage coefficients for each patch type respectively.

15. The method for removing noise from an image of claim 11, further comprising selecting one or more patches with the same color configuration.

16. The method for removing noise from an image of claim 11, further comprising selecting one or more patches with different color configurations respectively.

17. The method for removing noise from an image of claim 11, the 3D transformation further comprises a 2D discrete cosine transform (2D-DCT).

18. The method for removing noise from an image of claim 11, wherein the 3D transformation comprises a 2D discrete wavelet transform (2D-DWT) transform following with a 1-D Haar/Hadamard transform.

19. The method for removing noise from an image of claim 11, wherein estimating the patch type further comprises estimating spatial distribution of the one or more patches.

20. The method for removing noise from an image of claim 11, wherein estimating the patch type further comprises calculating patch distances between one or more adjacent patches.

21. The method for removing noise from an image of claim 11, wherein estimating a patch type further comprises classifying patch types and grouping similar patch types based on the calculated patch distances.

22. The method for removing noise from an image of claim 21, wherein classifying patch types further comprises a fast block matching algorithm.

23. The method for removing noise from an image of claim 11, wherein estimating the patch type further comprises rotating one or more patches in order to have a same color configuration.

24. The method for removing noise from an image of claim 11, wherein estimating the patch type further comprises an n-dimensional vector represents number of matched patches in each direction of the fast block matching algorithm.

25. The method for removing noise from an image of claim 11, wherein determining a mean RGB value further comprises a least square training scheme.

26. The method for removing noise from an image of claim 11, wherein obtaining the set of shrinkage functions further comprises a green-red green-blue (GrGb) correction process.

27. The method for removing noise from an image of claim 11, wherein obtaining the set of shrinkage functions further comprises a chromatic value correction process.

* * * * *

UNITED STATES PATENT AND TRADEMARK OFFICE
CERTIFICATE OF CORRECTION

PATENT NO. : 9,454,807 B2  
APPLICATION NO. : 14/759061  
DATED : September 27, 2016  
INVENTOR(S) : Chen et al.

Page 1 of 1

It is certified that error appears in the above-identified patent and that said Letters Patent is hereby corrected as shown below:

Title page:

Item (73) Residence of ASSIGNEE please change "Cambridge (GB)" to -- Shanghai, (CN) --

Signed and Sealed this  
Fifteenth Day of November, 2016

Michelle K. Lee  
*Director of the United States Patent and Trademark Office*